US011573685B2

(12) United States Patent
Takayama

(10) Patent No.: US 11,573,685 B2
(45) Date of Patent: Feb. 7, 2023

(54) DISPLAY DATA GENERATION METHOD, COMPUTER-READABLE, NON-TRANSITORY MEDIUM AND COMPUTER

(71) Applicant: GREE, Inc., Tokyo (JP)

(72) Inventor: Daisuke Takayama, Tokyo (JP)

(73) Assignee: GREE, Inc., Tokyo (JP)

(*) Notice: Subject to any disclaimer, the term of this patent is extended or adjusted under 35 U.S.C. 154(b) by 0 days.

(21) Appl. No.: 16/914,933

(22) Filed: Jun. 29, 2020

(65) Prior Publication Data

US 2020/0326821 A1  Oct. 15, 2020

Related U.S. Application Data

(63) Continuation of application No. 15/633,816, filed on Jun. 27, 2017, now Pat. No. 10,732,801, which is a
(Continued)

(30) Foreign Application Priority Data

Jan. 31, 2014  (JP) ............................. JP2014-017876

(51) Int. Cl.
*G06F 3/0483* (2013.01)
*A63F 13/35* (2014.01)
(Continued)

(52) U.S. Cl.
CPC ............ *G06F 3/0483* (2013.01); *A63F 13/35* (2014.09); *A63F 13/355* (2014.09); *A63F 13/53* (2014.09);
(Continued)

(58) Field of Classification Search
CPC .... G06F 3/0483; G06F 3/0488; G06F 3/0482; G06F 3/0485; G06F 3/04883;
(Continued)

(56) References Cited

U.S. PATENT DOCUMENTS 5,374,295 A  9/1994 Angulnick et al.
7,689,916 B1  3/2010 Goel
(Continued)

FOREIGN PATENT DOCUMENTS

JP  2001-265481 A  9/2001
JP  2002-197088 A  7/2002
(Continued)

OTHER PUBLICATIONS

Office Action for corresponding Japanese Patent Application No. 2015-210055, dated Apr. 18, 2017, (3 pp.), including English translation (6 pages).
(Continued)

*Primary Examiner* — Keith D Bloomquist
(74) *Attorney, Agent, or Firm* — Oblon, McClelland, Maier & Neustadt, L.L.P.

(57) ABSTRACT

A display data generation method used in a computer including an output module, includes generating display data of page numbers for scrollably displaying page numbers of a plurality of pages each containing predetermined item information, to output the display data of page numbers from the output module, retrieving page information indicating a same number of pages as a number of page numbers displayed in a distance corresponding to a distance between two points in a display region in which the page numbers are displayed when the two points are specified by the user, wherein the number of page numbers are calculated based on the distance between the two points and the distance between adjacent page numbers displayed in the display region, and generating item display data for displaying item information contained in the pages indicated in the retrieved page information, to output the item display data from the output module.

15 Claims, 10 Drawing Sheets

Related U.S. Application Data continuation of application No. 14/607,392, filed on Jan. 28, 2015, now Pat. No. 9,760,253.

(51) Int. Cl.

| | |
|---|---|
| *A63F 13/92* | (2014.01) |
| *A63F 13/53* | (2014.01) |
| *A63F 13/355* | (2014.01) |
| *G06F 3/04883* | (2022.01) |
| *G06F 16/951* | (2019.01) |
| *G06F 16/957* | (2019.01) |
| *G06F 3/0482* | (2013.01) |
| *G06F 3/0485* | (2022.01) |
| *G06F 3/0488* | (2022.01) |

(52) U.S. Cl.
CPC ............ *A63F 13/92* (2014.09); *G06F 3/0482* (2013.01); *G06F 3/0485* (2013.01); *G06F 3/0488* (2013.01); *G06F 3/04883* (2013.01); *G06F 16/951* (2019.01); *G06F 16/9577* (2019.01); *G06F 2203/04808* (2013.01)

(58) Field of Classification Search
CPC ............ G06F 16/951; G06F 16/9577; G06F 2203/04808; A63F 13/35; A63F 13/355; A63F 13/53; A63F 13/92
See application file for complete search history.

(56) References Cited

U.S. PATENT DOCUMENTS

| | | |
|---|---|---|
| 9,098,480 B2 | 8/2015 | Kim |
| 2001/0024195 A1 | 9/2001 | Hayakawa |
| 2002/0091739 A1* | 7/2002 | Ferlitsch ............. G06F 3/04815 715/273 |
| 2004/0085364 A1* | 5/2004 | Keely ................... G06F 3/0488 715/804 |
| 2006/0107237 A1 | 5/2006 | Kim |
| 2007/0132789 A1 | 6/2007 | Ording et al. |
| 2007/0236475 A1 | 10/2007 | Wherry |
| 2008/0288894 A1 | 11/2008 | Han |
| 2009/0234568 A1 | 9/2009 | Kawauchi |
| 2010/0083179 A1 | 4/2010 | Decker |
| 2010/0115450 A1 | 5/2010 | Scott |
| 2010/0245274 A1 | 9/2010 | Fukuda |
| 2010/0257486 A1 | 10/2010 | Smith |
| 2011/0050629 A1 | 3/2011 | Homma et al. |
| 2011/0296344 A1 | 12/2011 | Habib |
| 2012/0054673 A1 | 3/2012 | Kim et al. |
| 2012/0206481 A1 | 8/2012 | Endo et al. |
| 2012/0206498 A1 | 8/2012 | Kai et al. |
| 2012/0290964 A1 | 11/2012 | Lee |
| 2012/0293553 A1 | 11/2012 | Lee |
| 2013/0100497 A1 | 4/2013 | Amiya et al. |
| 2013/0198692 A1 | 8/2013 | Lin |
| 2013/0268847 A1 | 10/2013 | Kim |
| 2013/0286446 A1 | 10/2013 | Nitta |
| 2014/0053066 A1 | 2/2014 | Imamura |
| 2014/0189558 A1 | 7/2014 | Takami |
| 2014/0365867 A1 | 12/2014 | Kawasaki et al. |
| 2015/0042588 A1 | 2/2015 | Park |
| 2015/0193099 A1* | 7/2015 | Murphy ................ G06F 3/0483 715/777 |
| 2015/0242074 A1 | 8/2015 | Iwamoto |

FOREIGN PATENT DOCUMENTS

| | | |
|---|---|---|
| JP | 2006-146897 A | 6/2006 |
| JP | 2009-518758 A | 5/2009 |
| JP | 2011-53971 A | 3/2011 |
| JP | 2012-133732 A | 7/2012 |
| JP | 2012-168790 A | 9/2012 |
| JP | 2012-168943 A | 9/2012 |
| JP | 2012-215648 A | 11/2012 |
| JP | 2012-248164 | 12/2012 |
| JP | 2013-13626 A | 7/2013 |
| JP | 2003-330586 A | 11/2013 |
| WO | WO 2011/075316 A1 | 6/2011 |

OTHER PUBLICATIONS

Japanese Office Action dated Jun. 16, 2015 for corresponding Japanese Patent Application No. 2015-063127, including English translation, 5 pages.
International Search Report for International Application No. PCT/JP2014/062726, dated Aug. 12, 2014, 5 pp. including English translation.
Written Opinion for International Application mailed No. PCT/JP2014/062726, dated Aug. 12, 2014, 8 pp. including English Translation.
Office Action dated Apr. 22, 2014 for Japanese Application No. JP 2014-065976, 7 pp. including English Translation.
Office Action dated Aug. 5, 2014 for Japanese Application No. JP 2013-135056, 5 pp. including English Translation.
Final Rejection Office Action dated Aug. 8, 2014 for Japanese Application No. JP 2014-065976, 6 pp. including English Translation.
Decision of Final Rejection dated Jan. 16, 2015 for Japanese Application No. JP 2014-065976, 2 pp. including English Translation.
Office Action dated May 12, 2015 in corresponding Japanese Patent Application No. 2015-083712, including English Translation, 7pp.
URL: pxgrid.github.com/jsflipsnap/demo.html; 2011; 15 pp.
URL: www.google.co.jp/;1998; 3pp.
URL: m.yahoo.co.jp/; 1995; 2pp.
Japanese Office Action dated Jul. 4, 2017 in Patent Application No. 2015-210055 (with English translation).
Office Action dated Oct. 11, 2017 in Japanese Patent Application No. 2015-210055 (with unedited computer generated English translation).

\* cited by examiner

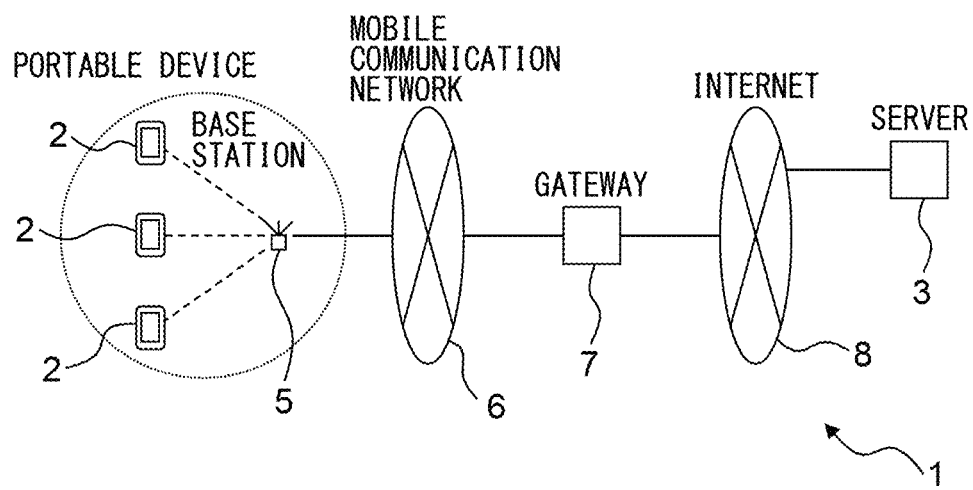
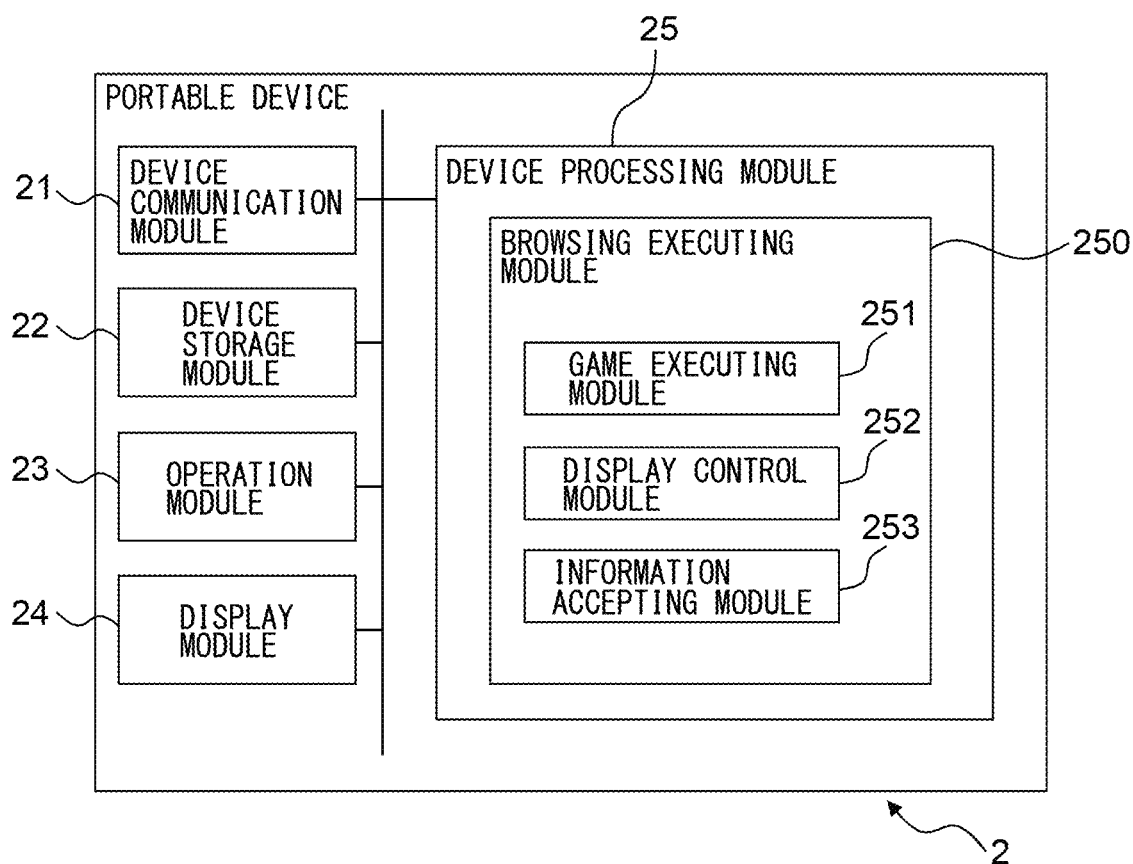

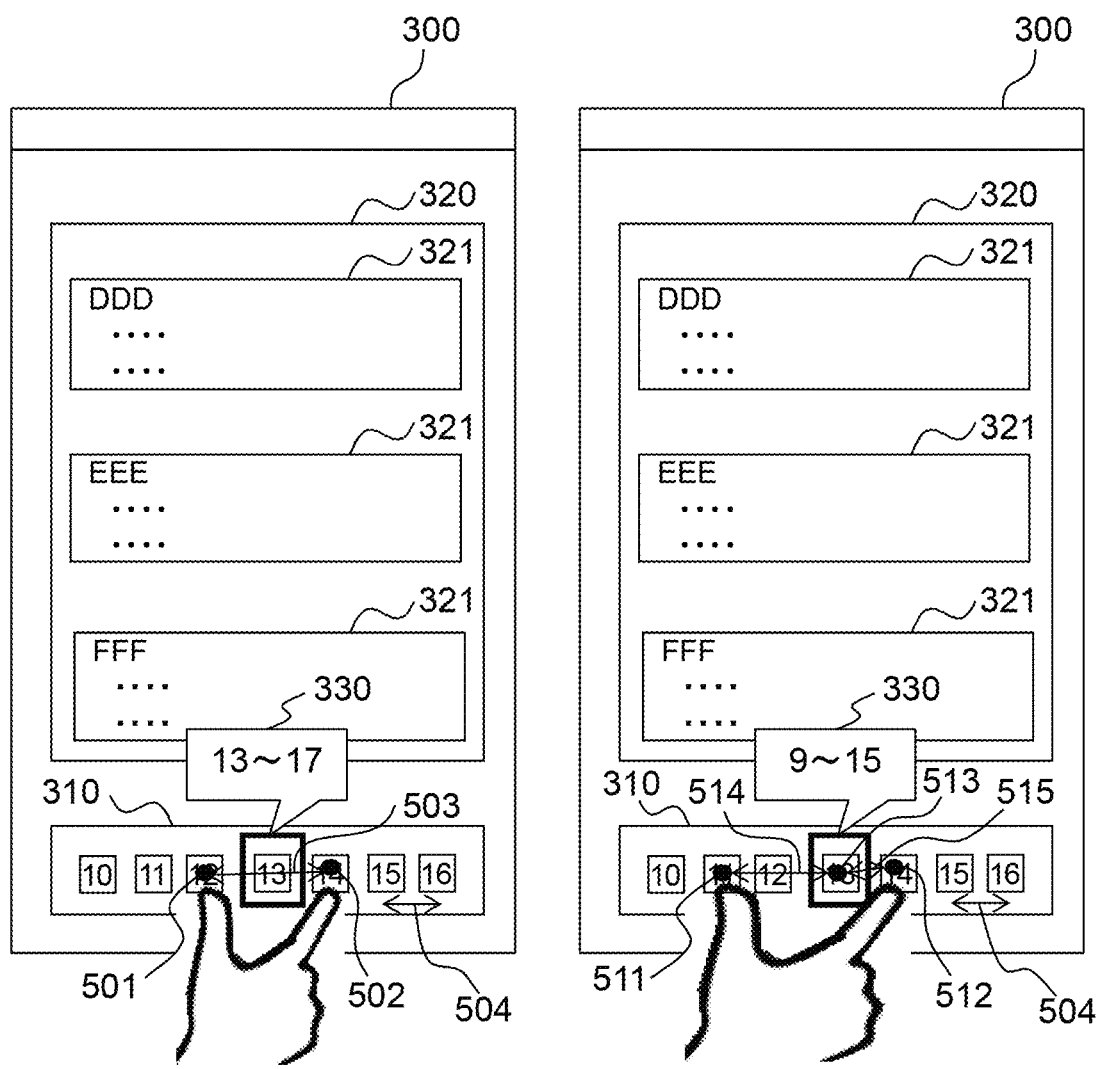

DISPLAY DATA GENERATION METHOD, COMPUTER-READABLE, NON-TRANSITORY MEDIUM AND COMPUTER

CROSS-REFERENCE TO RELATED APPLICATIONS

This present application is a continuation application which claims the benefit of priority under 35 U.S.C. § 120 of U.S. patent application Ser. No. 15/633,816, filed Jun. 27, 2017, which is a continuation of U.S. patent application Ser. No. 14/607,392, filed Jan. 28, 2015 (U.S. Pat. No. 9,760, 253), which is based upon and claims the benefit of priority of prior Japanese Patent Application No. 2014-017876, filed on Jan. 31, 2014, the entire contents of each of which are incorporated herein by reference.

TECHNICAL FIELD

Embodiments discussed in the present specification relate to generating display data.

BACKGROUND

Several display methods are employed so that when a portable information device that has a small display, such as the so-called smart phone, displays information concerning many items stored in a server or the like, a user can find and browse desired information among the many items of information. For example, a portable information device scrollably displays pieces of information to allow a user to find and browse desired information by a scrolling operation. Alternatively, a portable information device displays a predetermined number of pieces of information at a time and displays, together with the predetermined number of pieces of information currently displayed, a "See more" button or the like for displaying the next predetermined number of pieces of information so that the user can find and browse desired information by touching or depressing the button.

However, when there are numerous pieces of information from currently displayed information to information that the user wants to browse, the user is required to perform the scroll operation or touch or depression of the "See more" button many times before reaching desired information, which requires much time and labor.

For example, in the search engine "Google, Inc., [Google], [online], Internet (URL: https://www.google-.co.jp/)", a search server that receives a search request from a device divides a plurality of items found in a search into a plurality of pages, and arranges and displays the items in order so that a user can specify the page number of each page. When one of the page numbers displayed on the device is specified by the user, the search server displays items corresponding to the specified page numbers on the device.

Japanese Laid-Open Patent Publication No. 2013-137626 describes an information processing apparatus that classifies items, such as articles of commerce, which make up a list, on the basis of classification criteria according to attributes such as the prices of the items to determine a plurality of groups of items, and creates a page brake so that all of the items included in the each item group are displayed in the same page.

The search engine "Google, Inc." allows a user to select a particular page from among a plurality of pages so that the user can quickly find and browse a desired item. However, the user is not allowed to change the number of items to be displayed at the same time and this may impair UX (user experience: details of experience and satisfaction of the user) when the user operates the device.

The information processing apparatus in Japanese Laid-Open Patent Publication No. 2013-137626 can classify a plurality of items into groups by attributes and display the classified items in each page. However, when there are many items that have the same attribute, the number of items to be displayed on one page is increased and the user is required to perform a scroll operation many times before reaching the desired item. On the other hand, when there are few items that have the same attribute, the number of items to be displayed on one page is decreased and the user is required to display many pages in sequence to find the desired item.

SUMMARY

It is an object of the disclosed display data generation method, computer-readable, non-transitory medium, and computer to enable improvement of UX when a user operates a device.

Provided is a display data generation method used in a computer including an output module. The method includes generating display data of page numbers for scrollably displaying page numbers of a plurality of pages each containing predetermined item information, to output the display data of page numbers from the output module, retrieving page information indicating a same number of pages as a number of page numbers displayed in a distance corresponding to a distance between two points in a display region in which the page numbers are displayed when the two points are specified by the user, wherein the number of page numbers are calculated based on the distance between the two points and the distance between adjacent page numbers displayed in the display region, and generating item display data for displaying item information contained in the pages indicated in the retrieved page information, to output the item display data from the output module.

Preferably, in the display data generation method, the display data generation method further includes specifying, by the user, a page from among the page numbers displayed in the display region, wherein the same number of pages as the number of the page numbers include the specified page.

Preferably, in the display data generation method, the same number of pages as the number of the page numbers start at the specified page.

Preferably, in the display data generation method, the same number of pages as the number of the page numbers are determined from a positional relation between the position of the specified page in the display region and the position of each of the two points.

Preferably, in the display data generation method, two points pointed on completion of a swipe operation by the user pointing two points in the display region are specified as the two points in the display region.

Preferably, in the display data generation method, two points pointed in response to a swipe operation by the user pointing two points in the display region are specified as the two points in the display region.

Preferably, in the display data generation method, the display data generation method further includes generating display data of pointed page numbers for displaying page numbers corresponding to two points pointed in response to the swipe operation, to output the display data of pointed page numbers from the output module.

Preferably, in the display data generation method, the item information is information of a stage in a quest or information of an enemy in a battle.

Preferably, in the display data generation method, the item display data is generated using Ajax (registered trademark).

Preferably, in the display data generation method, the output module is a communication module for communicating with a device displaying the item information.

Provided is a computer-readable, non-transitory medium storing a computer program, wherein the computer program causes a computer including an output module, to execute a process. The process includes generating display data of page numbers for scrollably displaying page numbers of a plurality of pages each containing predetermined item information, to output the display data of page numbers from the output module, retrieving page information indicating a same number of pages as a number of page numbers displayed in a distance corresponding to a distance between two points in a display region in which the page numbers are displayed when the two points are specified by the user, wherein the number of page numbers are calculated based on the distance between the two points and the distance between adjacent page numbers displayed in the display region, and generating item display data for displaying item information contained in the pages indicated in the retrieved page information, to output the item display data from the output module.

Provided is a computer. The computer includes an output module, a display data generating module for generating display data of page numbers for scrollably displaying page numbers of a plurality of pages each containing predetermined item information, to output the display data of page numbers from the output module, and an information retrieving module for retrieving page information indicating a same number of pages as a number of page numbers displayed in a distance corresponding to a distance between two points in a display region in which the page numbers are displayed when the two points are specified by the user, wherein the number of page numbers are calculated based on the distance between the two points and the distance between adjacent page numbers displayed in the display region, wherein the display data generating module generates item display data for displaying item information contained in the pages indicated in the retrieved page information, to output the item display data from the output module.

The display data generation method, the computer-readable, non-transitory medium, and computer can improve UX when a user operates a device by scrollably displaying the page numbers of pages each containing predetermined item information concerning a particular item and displaying item information contained in a same number of pages as the number of pages based on the distance between two points specified by the user in a display region in which the page numbers are displayed.

BRIEF DESCRIPTION OF THE DRAWINGS

Other features and advantages of the embodiment will be apparent from the ensuing description, taken in conjunction with the accompanying drawings, in which:

FIG. 1 is a diagram illustrating an example of a general configuration of a game system 1;

FIG. 2 is a diagram illustrating an example of a general configuration of a portable device 2;

FIG. 5A is a schematic diagram for illustrating a process for retrieving the number of pages pointed by two points and pointed page numbers;

FIG. 5B is a schematic diagram for illustrating a process for retrieving the number of pages pointed by two points and pointed page numbers;

DESCRIPTION OF EMBODIMENTS

Figure 3A:
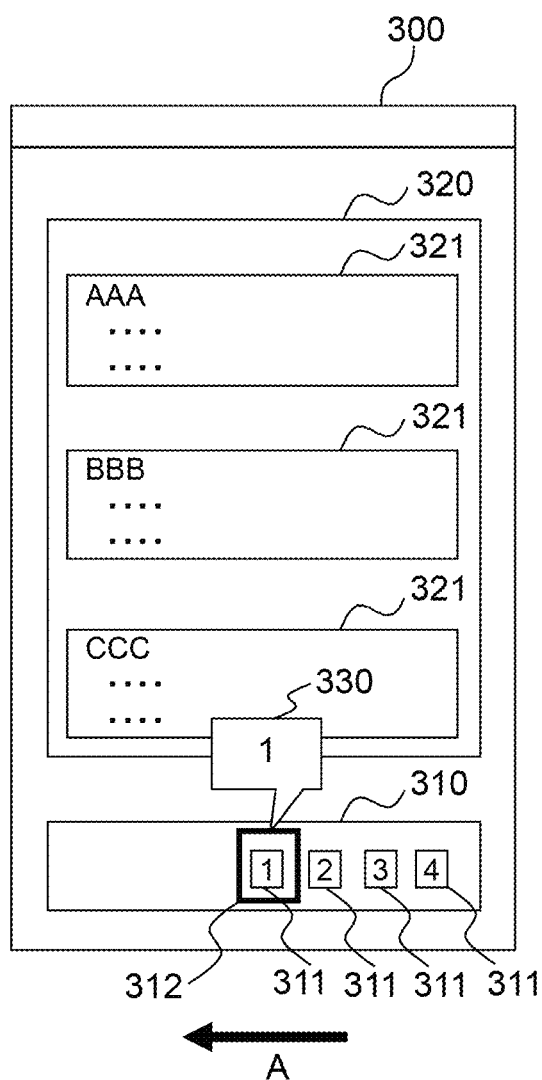
FIG. 3A is a diagram illustrating an example of a screen 300 displayed on a display module 24 of the portable device 2.

The display data generation method, the computer-readable, non-transitory medium, and the computer according to one aspect of this application will now be described with reference to the drawings. However, it should be noted that the technical scope of this application is not limited to these embodiments and extends to the inventions described in appended claims and their equivalents.

(1) Overview of the Embodiment

In the present embodiment, a user uses a portable device to play a game provided from a server. The game provided is a game, such as a battle with an enemy character or another user or a quest that progresses according to a game scenario, which uses game media held by the user. The game media are electronic data used for games and include cards, items, characters, avatars and the like, for example. Furthermore, the game media are electronic data that can be retrieved, held, used, managed, exchanged, combined, enhanced, sold, discarded, and/or donated by a user in games as the game progresses, but the type of usage of the game media is not limited to the type explicitly described herein. The quest is also commonly referred to as an exploration, mission or the like, has a plurality of stages, and processing of the stages are sequentially executed.

The server stores a plurality of pieces of item information which are information of particular items, such as information of enemies in a battle, information of the stages of a quest, and information of characters and items used in a game, and comments posted on a message board by users. Information of enemies in a battle may be the name, level and attributes of the each enemy in a battle, and the like.

Information of the stages of a quest may be the names of the stages, the levels of difficulty, and the like. In response to a request from a user through a portable device, the server arranges identification numbers (hereinafter referred to as page numbers) of a plurality of pages, each containing predetermined item information, and causes the portable device to scrollably display the numbers. The server displays item information contained in a page specified by the user on the portable device. Furthermore, when two points in a display region where the page numbers are displayed are specified by the user, the server causes the portable device to display item information contained in a same number of pages as the number of pages based on the distance between the specified two points. This enables improvement of UX when the user operates the device.

(2) Configuration of Game System 1

FIG. 1 is a diagram illustrating an example of a general configuration of a game system 1.

The game system includes a plurality of portable devices 2 and a server 3. The portable devices 2 and the server 3 are interconnected through a communication network, for example, through a base station 5, a mobile communication network 6, a gateway 7 and the internet 8. A program (for example a browser program) executed on the portable devices 2 and a program (for example a game program) executed on the server 3 communicate with each other using a communication protocol such as the Hypertext Transfer Protocol (HTTP).

(2.1) Configuration of Portable Device 2

FIG. 2 is a diagram illustrating an example of a general configuration of each portable device 2.

The portable device 2 connects to the server 3 through the base station 5, the mobile communication network 6, the gateway 7, and the Internet 8 to communicate with the server 3. The portable device 2 executes a game provided from the server 3 and displays a plurality of pieces of item information stored in the server 3 by dividing the pieces of item information into a plurality of pages each including a predetermined number of pieces of item information. The portable device 2 scrollably displays the page numbers of the pages, retrieves, from the server 3, pieces of item information corresponding to a page number and the number of pages specified by a user operation using an operation module 23, and displays the pieces of item information. For that purpose, the portable device 2 includes a device communication module 21, a device storage module 22, the operation module 23, a display module 24 and a device processing module 25.

Note that while it is assumed in the present embodiment that the portable device 2 is a multifunctional mobile phone (the so-called "smartphone"), the present invention is not limited to this. The portable device 2 may be any device to which the present application can be applied, such as a mobile phone (also known as a "feature phone"), a Personal Digital Assistant (PDA), a portable game machine, a portable music player, or a tablet PC (Personal Computer), or a personal computer.

The device communication module 21 includes communication interface circuitry including an antenna that has a sensing band in predetermined frequency range and connects the portable device 2 to a wireless communication network. The device communication module 21 establishes a wireless signal link with the base station 5 using CDMA (Code Division Multiple Access) or other method through a channel allocated by the base station 5 and communicates with the base station 5. The device communication module 21 sends data provided from the device processing module 25 to the server 3 or other devices. Furthermore, the device communication module 21 provides data received from the server 3 or other devices to the device processing module 25. Note that the device communication module 21 may perform wireless communication with a Wifi (Wireless Fidelity) access point, not depicted, using a wireless communication method of the IEEE 802.11 standards.

The device storage module 22 includes at least one of a semiconductor memory, a magnetic disk unit, and an optical disc unit, for example. The device storage module 22 stores an operating system program, driver programs, application programs, data and the like which are used for processing in the device processing module 25. For example, the device storage module 22 stores driver programs such as an input device driver program that controls the operation module 23 and an output device driver program that controls the display module 24. The device storage module 22 also stores as an application program a browser program or the like that scrollably displays the page numbers of pages and displays item information corresponding to a page number and the number of pages which are specified by the user. The computer program may be installed on the device storage module 22 from a computer-readable, non-transitory medium such as a compact disk read only memory (CD-ROM), a digital versatile disk read only memory (DVD-ROM), or the like by using a well-known setup program or the like. The device storage module 22 stores as data beforehand the number of pieces of item information to be displayed per page (hereinafter referred to as the display item count) when a plurality of pieces of item information are divided into a plurality of pages and displayed on the display module 24, and stores item information and other information retrieved from the server 3. Furthermore, the device storage module 22 may temporarily store temporary data relating to a given process.

The operation module 23 may be any device through which the portable device 2 can be operated, such as a touchpad or a keyboard. The user can use the operation module 23 to input characters, numbers, scroll operations and the like. When operated by the user, the operation module 23 generates a signal corresponding to the operation. The generated signal is provided to the device processing module 25 as a user instruction.

The display module 24 may be any device that can display videos, images and the like and may be a display such as a liquid-crystal display or an organic EL (Electro-Luminescence) display, for example. The display module 24 displays a video according to video data provided from the device processing module 25, an image according to image data provided from the device processing module 25, and the like.

The device processing module 25 includes one or more processors and their peripheral circuitry. The device processing module 25 centrally controls the general operations of the portable device 2 and may be a CPU (Central Processing Unit), for example. The device processing module 25 controls operations of the device communication module 21, the display module 24, and other modules so that various processes on the portable device 2 are executed using proper procedures in accordance with programs stored in the device storage module 22, operations with the operation module 23 and the like. The device processing module 25 executes processes on the basis of the programs (the operating system program, the driver programs, the application programs and the like) stored in the device storage module 22. The device processing module 25 is capable of executing a plurality of programs (such as application programs) in parallel.

(2.1.1) Configuration of Device Processing Module 25

The device processing module 25 includes at least a browsing executing module 250. The browsing executing module 250 includes a game executing module 251, a display control module 252, and an information accepting module 253 and the like. These modules are functional modules implemented by programs executed by a processor or processors provided in the device processing module 25. Each of the modules may be incorporated in the portable device 2 as firmware.

The browsing executing module 250 sends a request to retrieve particular display data to the server 3 through the device communication module 21 in response to an instruction from the user using the operation module 23. The browsing executing module 250 receives corresponding display data from the server 3 through the device communication module 21. The browsing executing module 250 generates graphics data on the basis of the received display data. Specifically, the browsing executing module 250 analyzes the received display data to identify control data and content data and lays out the identified content data in accordance with the identified control data to generate graphics data. The browsing executing module 250 outputs the generated graphics data to the display module 24.

The game executing module 251 executes a game provided from the server 3 in response to an instruction from the user by using the operation module 23. When the game executing module 251 accepts a game start instruction from the user using the operation module 23, the game executing module 251 further accepts a user ID and a password from the user by using the operation module 23 and sends a user authentication request including the accepted user ID and password to the server 3 through the device communication module 21. When the server 3 successfully authenticates, the game executing module 251 displays a game screen retrieved from the server 3 through the device communication module 21 on the display module 24, accepts an operation from the user by using the operation module 23, and thereafter performs processing for the game.

In response to an instruction from the user by using the operation module 23, the display control module 252 scrollably displays the page numbers of pages and outputs graphics data displaying item information contained in a page specified by the user, the specified page number and the like to the display module 24. For this purpose, the display control module 252 sends retrieving request for display-data for requesting to retrieve display data relating to the graphics data to the server 3 through the device communication module 21. The retrieving request for display-data includes the display item count stored in the device storage module 22. The display control module 252 retrieves corresponding display data from the server 3 through the device communication module 21, generates graphics data on the basis of the retrieved display data, and outputs the generated graphics data to the display module 24. The display data can be generated by using a language such as HTML 5 (HyperText Markup Language 5), CSS 3 (Cascading Style Sheets 3) and JavaScript (registered trademark), for example.

The display data sent from the server 3 include, as content data, a same number of pieces of item information as the display item count, starting at the first one of the pieces of item information stored in the server 3, and includes, as control data, information for displaying the pieces of item information. Hereinafter, data for displaying the same number of pieces of item information as the display item count, starting at the first piece of item information, will be sometimes referred to as initial item display data.

The display data further includes, as content data, the same number of page numbers as the number of all of a plurality of pages and includes, as control data, information for specifying any of the page numbers by the user and for arranging the page numbers to be scrollably displayed. Hereinafter, data for displaying the same number of page numbers as the number of all pages may be referred to as display data of all page numbers.

The display data further includes, as content data, a display field for a pointed page number for displaying a page number currently being pointed by the user or a page number specified by the user and includes, as control data, information for displaying a page number currently being pointed by the user or a page number specified by the user in the display field for a pointed page number. Hereinafter, data for displaying a page number currently being pointed by the user or a page number specified by the user will be sometimes referred to as display data of pointed page numbers.

Note that the term "pointed" as used here means that a page number or the like is being selected. For example, if the operation module 23 is a touch panel, the term "pointed" refers to a state where the user is touching a particular region in a touch panel with a finger or the like in a swipe operation or the like. On the other hand, the term "specified" means that a page number is confirmed, for example, refers to a state immediately after the user takes a finger or the like off the touch panel in a swipe operation or the like. Hereinafter, a page number being pointed will be sometimes referred to as a pointed page number and a page number being specified may be referred to as a specified page number.

The display control module 252 stores pieces of item information included in display data retrieved from the server 3 in the device storage module 22. Additionally, the display control module 252 displays pieces of item information on the display module 24 on the basis of initial item display data. Further, the display control module 252 arranges and scrollably displays page numbers on the display module 24 on the basis of display data of all page numbers. Furthermore, the display control module 252 displays a display field for a pointed page number providing a pointed page number or a specified page number on the display module 24 on the basis of display data of pointed page numbers. Hereinafter, pieces of item information displayed on the display module 24 will be referred to as an item list and a display region in which page numbers are scrollably arranged and displayed will be referred to as a scroll pager.

When a given page number among the pages displayed in the scroll pager is specified by an operation by the user using the operation module 23 as will be described later, the display control module 252 sends a retrieving request for item information that requests retrieving request for item information contained in the specified page to the server 3 through the device communication module 21. The retrieving request for item information includes page information relating to the specified page. In other words, the page information indicates the specified page. The page information may be a specified page number, for example. Note that when a plurality of a same number of page numbers as a particular number of pages are specified by an operation by the user using the operation module 23 as will be described later, the retrieving request for item information includes page information indicating the same number of pages as the particular number of pages. In that case, the page information indicating the same number of pages as the particular number of pages can be the page numbers of the first and last pages among the plurality of specified page numbers. Note that page information indicating the same number of pages as the particular number of pages may be all of specified page numbers or the page number of the first page among specified page numbers and the number of pages.

The display control module 252 retrieves content data and control data for displaying item information contained in a page corresponding to page information included in an retrieving request for item information from the server 3 through the device communication module 21. Hereinafter, data for displaying item information contained in a page corresponding to page information will be sometimes referred to as item display data. Item display data may be created using a language such as JSON (JavaScript Object Notation) (registered trademark) and retrieved by using a technique such as Ajax (Asynchronous JavaScript and XML) (registered trademark). The display control module 252 stores pieces of update information included in the retrieved content data in the device storage module 22, updates graphics data on the basis of the retrieved content data and control data, and displays the updated graphics data on the display module 24.

FIGS. 3A and 35 are diagrams illustrating an example of a screen 300 displayed on the display module 24.

FIG. 3A illustrates a screen 300 displayed when an instruction to display item information is accepted for the first time from the user by using the operation module 23. The screen 300 is displayed on the basis of initial item display data, display data of all page numbers and display data of pointed page numbers received from the server 3. As illustrated in FIG. 3A, a scroll pager 310, an item list 320, and a display field for a pointed page number 330 are displayed on the screen 300. In the scroll pager 310, page numbers 311 are arranged and scrollably displayed. In the item list 320, item information 321 corresponding to a page number 311 located at the center position 312 in the scroll pager 310 is displayed. Note that the pieces of item information 321 are displayed in reverse chronological order, for example, from the top. When an instruction to display item information is accepted for the first time from the user by using the operation module 23, the first page number "1" is located at the center position 312 and an item list 320 indicating item information 321 corresponding to the page number "1" is displayed. When there are too many pieces of item information 321 to display all of the pieces of item information 321 in the item list 320, the item list 320 is displayed in such a way that the pieces of item information 321 can be scrolled in the vertical direction (the y direction). In the display field for a pointed page number 330, a specified page number that is currently being specified is displayed as a balloon from the scroll pager 310. In the state illustrated in FIG. 3A, the page number "1" is displayed as the specified page number.

Figure 3B:
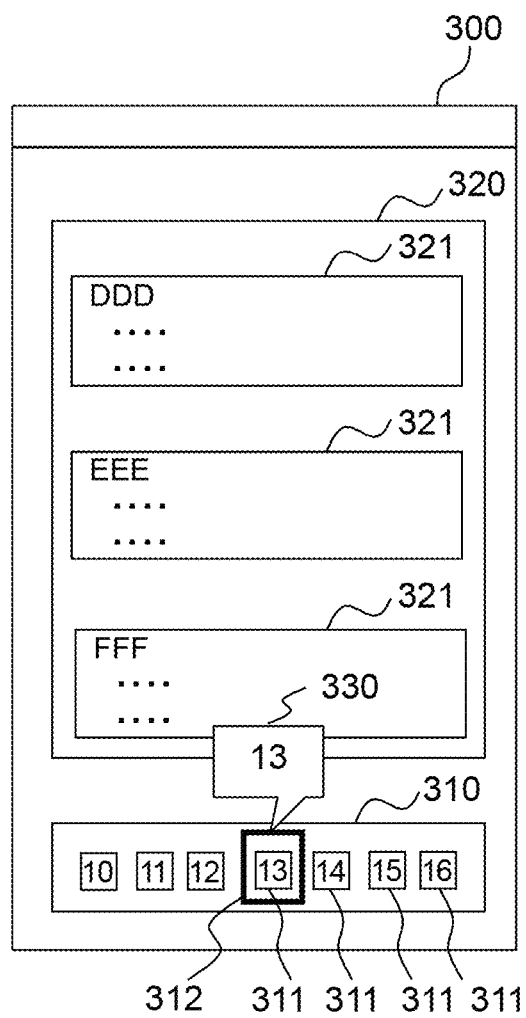
FIG. 3B is a diagrams illustrating an example of a screen 300 displayed on a display module 24 of the portable device 2.

FIG. 3B illustrates a screen 300 displayed when a scroll operation is performed by the user in the direction indicated by arrow A in FIG. 3A in the scroll pager 310. As a result of the user's scroll operation, the page number "13" is located at the center position 312 in the scroll pager 310, the page number "13" is displayed in the display field for a pointed page number 330 as the specified page number, and item information 321 corresponding to the page number "13" is displayed in the item list 320 in FIG. 3B. The user can scroll the scroll pager 310 horizontally to specify a desired page number, and scroll the item list 320 vertically to browse desired item information.

The information accepting module 253 retrieves a page number specified by an operation by the user by using the operation module 23 from among the page numbers displayed in the scroll pager and provides the specified page number to the display control module 252 to cause the display control module 252 to send a retrieving request for item information to the server 3. Page information included in the retrieving request for item information in this case includes the specified page number, i.e. the page specified by the user.

Hereinafter, a method for retrieving a page number will be described with an example in which the operation module 23 is a touch panel. Note that it is assumed in this embodiment that properties of webkit-transform of css3 are used in order to perform various processes described below.

First, in response to a flick operation (scroll operation) on the scroll pager by the user, the information accepting module 253 retrieves position information of a starting point indicating the starting point (touch 1) at which the touch panel has started sensing a contact from the operation module 23. The information accepting module 253 also retrieves the time at which the information accepting module 253 has retrieved the position information of a starting point from the operation module 23 as time information of a starting point indicating the time (time 1) at which the touch panel has started sensing the touch. The information accepting module 253 then retrieves position information of an ending point indicating the ending point (touch 2) at which the touch panel has ceased sensing the contact responding to the flick operation on the scroll pager by the user from the operation module 23. The information accepting module 253 also retrieves the time at which the information accepting module 253 has retrieved the position information of an ending point from the operation module 23 as time information of an ending point indicating the time (time 2) at which the touch panel has ceased sensing the touch. The positions indicated by the position information of a starting point and position information of an ending point may be represented by x-coordinate values indicating positions in the horizontal direction with respect to the upper left corner of the screen of the display module 24 (i.e. (x, y, z)=(0, 0)).

The information accepting module 253 then subtracts the position indicated by the position information of a starting point from the position indicated by the position information of an ending point to obtain the movement distance (distance 1=touch 2−touch 1) from the starting point to the ending point. Since the positions indicated by the position information of a starting point and the position information of an ending point are measured with respect to the upper left corner of the screen of the portable device as stated above, distance 1 indicates a positive value when the user has performed a rightward flick operation whereas distance 1 indicates a negative value when the user has performed a leftward flick operation. The information accepting module 253 then subtracts the time indicated by the time information of a starting point from the time indicated by the time information of an ending point to obtain the contact duration (time 3=time 2−time 1) during which the portable device has been sensing the contact. Then the information accepting module 253 divides the movement distance, distance 1, by the contact duration, time 3, to obtain the speed (speed 1=distance 1/time 3) of the user's flick operation (hereinafter referred to as the operation speed). The unit of the operation speed is [pixel/second]. Note that an upper limit of the operation speed (for example, 440 pixels/second) may be preset because UX when the user is operating the portable device can be impaired when the operation speed exceeds a given operation speed.

The information accepting module 253 then sets, on the basis of the calculated operation speed, a movable duration during which the scroll pager can move. By setting the movable duration (for example, 0.4 seconds) as the Time value of webkitTransitionDuration, the duration in which the scroll pager is moving can be set. Note that the operation speed can be used as the movable duration. In that case, when the operation speed is low, a short movable duration can be set because the movement distance of the scroll pager is short and; when the operation speed is high, a long movable duration can be set because the movement distance of the scroll pager is long.

Then, on the basis of the movement distance from the starting point to the ending point and the operation speed, the information accepting module 253 calculates the amount of movement (movePoint) by which the scroll pager is to be moved. The information accepting module 253 calculates "movePoint=distance 1×(speed 1/$\alpha$)", for example, to obtain the amount of movement of the scroll pager. Here, $\alpha$ is an experimentally found constant and may be 56, for example. The amount of movement of the scroll pager may be calculated on the basis of distance 1 and speed 1, and may be calculated by a method other than the mathematical operation described above.

The information accepting module 253 then displays the scroll pager on the display module 24 in such a way that the scroll pager moves the calculated movement distance. For example, the information accepting module 253 can use webkitTransform=translate3d(x, y, z) to move the scroll pager.

While the scroll pager is described as moving horizontally (in the x direction) in this embodiment, the moving direction is not limited to this; the scroll pager may be designed to move vertically (in the y direction).

The information accepting module 253 then retrieves a page number located in a predetermined position at the end of the movement of the scroll pager as a specified page number, displays the retrieved specified page number in the display field for a pointed page number, and provides the retrieved specified page number to the display control module 252. The predetermined position may be the center position of the scroll pager in the horizontal direction, for example. The information accepting module 253 retrieves the page number that is in the center position of the scroll pager in the horizontal direction at the expiration of the movable duration.

Note that presetting webkitTransformTimingFunction "ease-out" allows the information accepting module 253 to move the scroll pager smoothly.

The information accepting module 253 uses the number of the page numbers contained in the entire scroll pager, the horizontal length of the region where each page number is displayed, and margin-right, which is a horizontal margin between adjacent regions where page numbers are displayed to calculate the distance over which the scroll pager can move (hereinafter referred to as the movable distance). Note that the information accepting module 253 can retrieve the horizontal length of the region where each page number is displayed and the margin-right by using the getComputedStyle method of JavaScript (registered trademark). The information accepting module 253 calculates "number of page numbers×(horizontal length of region where page number is displayed+margin-right)" to obtain the movable distance. By calculating the movable distance beforehand, the information accepting module 253 can perform "pullback behavior". When the calculated amount of movement is greater than the movable distance, the information accepting module 253 sets a value of the amount of movement multiplied by a predetermined value (for example, 0.9) less than 1 (movePoint×predetermined value) as the amount of movement by which the list is actually moved (hereinafter referred to as the amount of actual movement). This enables implementation of "pullback behavior" which displays the scroll pager in such a way that the scroll pager is pulled back in the direction opposite to the direction of the flick operation when for example the user continues a flick operation so that an end of the scroll pager goes beyond the center position. Note that the pullback behavior may be either continuous pullback behavior or intermittent pullback behavior.

Furthermore, the information accepting module 253 may set "display: none" for a desired page number or item information to hide the desired page number or item information.

Additionally, when one of the page numbers displayed in the scroll pager is tapped, the information accepting module 253 retrieves the tapped page number as a specified page number, displays the retrieved specified page number in the display field for a pointed page number, and provides the retrieved specified page number to the display control module 252.

Figure 4:
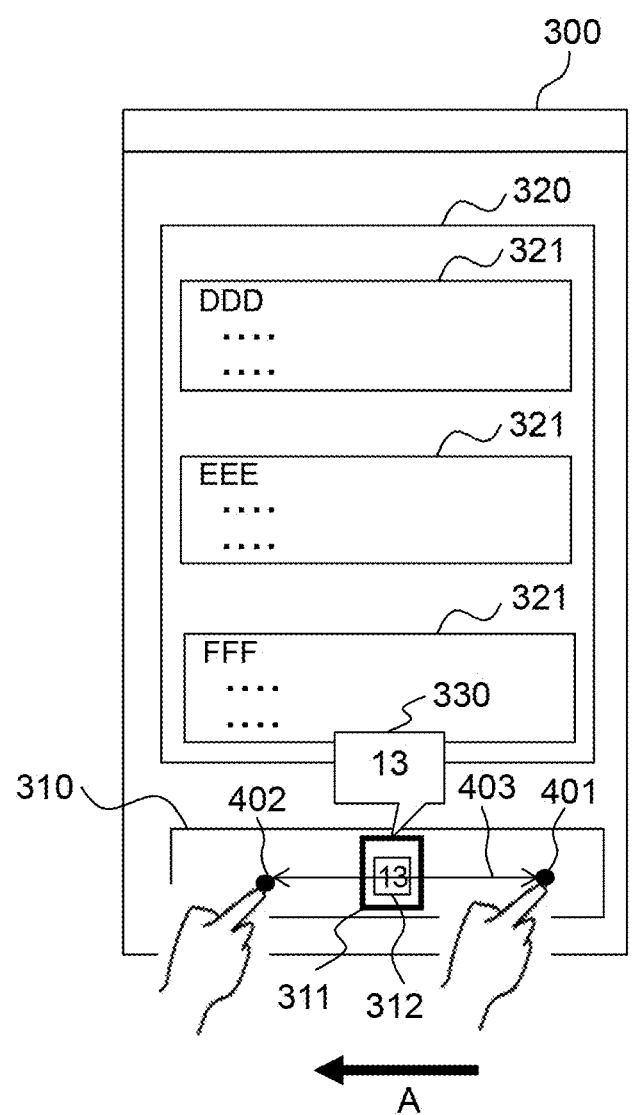
FIG. 4 is a schematic diagram for illustrating a process for retrieving a specified page number specified by a flick operation.

FIG. 4 is a schematic diagram for illustrating a process for retrieving a specified page number specified by a flick operation.

As illustrated in FIG. 4, when a flick operation in the direction indicated by arrow A is performed in the scroll pager 310 by the user, the information accepting module 253 retrieves a starting point 401 and an ending point 402 from the operation module 23 and retrieves the times at which the respective points have been retrieved. The information accepting module 253 calculates movement distance 403 from the starting point 401 and the ending point 402, calculates the contact duration from the times at which the respective points have been retrieved, and calculates the operation speed from the movement distance 403 and the contact duration. Note that since the user has performed a leftward flick operation in the example illustrated in FIG. 4, the movement distance is a negative value. The information accepting module 253 moves the scroll pager 310 leftward by the amount of movement determined on the basis of the calculated movement distance and retrieves the page number "13" located at the center position 312 at the end of the movement of the scroll pager as a specified page number.

Furthermore, when two points in the scroll pager are specified by the user, the information accepting module 253 retrieves a particular number of pages based on the distance between the specified two points and the distance between page numbers displayed in the scroll pager, and as many page numbers as the particular number of pages. In other words, the information accepting module 253 retrieves a same number of pages as a number of page numbers displayed in a distance corresponding to a distance between the two points in the scroll pager in which the page numbers are displayed, and the number of page numbers are calculated based on the distance between the two points and the distance between adjacent page numbers displayed in the scroll pager. The information accepting module 253 determines the number of pages and the page numbers on the basis of the relation between the distance between the specified two points and the distance between the page numbers.

The information accepting module 253 retrieves first position information and second position information which indicate the two points (touch 3, touch 4) pointed in response to a user operation (such as a tap operation or a swipe operation) that points the two points in the scroll pager.

The information accepting module 253 then calculates the absolute value of the difference between the position indicated by the first position information and the position indicated by the second position information as the distance between the two points (distance 2=|touch 3−touch 4|).

The information accepting module 253 then calculates the number of pages based on the distance between the two points. For example, the information accepting module 253 may divide the distance between the two points by the distance between page numbers (distance 3) and multiply the quotient by a predetermined factor (n, for example 2) to obtain the number of pages based on the distance between the two points (number of pages=(distance 2/distance 3)×n). Here, n may be a value greater than or equal to 1 or may be a value less than 1. If n=1, when two page numbers are pointed, the difference between the pointed two page numbers is equal to the number of pages based on the distance between the two points and thus the user can specify a desired number of pages with ease.

The information accepting module 253 then retrieves a same number of page numbers as the retrieved number of pages as pointed page numbers. For example, the information accepting module 253 retrieves, as pointed page numbers, the same number of page numbers as the number of pages in the positive direction based on the distance between the two points, starting at a page number that has been specified beforehand by a flick operation (the page number located at the center position of the scroll pager in the horizontal direction). Note that the information accepting module 253 may retrieve, as pointed page numbers, the same number of page numbers as the number of pages in the negative direction based on the distance between the two points, starting at a page number that has been specified beforehand by a flick operation. In this example, page information included in a retrieving request for item information is numbers assigned to the same number of pages as a particular number of pages, starting at a page specified by the user.

FIG. 5A is a schematic diagram for illustrating a process for retrieving the number of pages and page numbers according to pointed two points.

As illustrated in FIG. 5A, the user can point two points 501 and 502 in the scroll pager 310 by simultaneously tapping the two points with two fingers. When two points in the scroll pager 310 are pointed by the user, the information accepting module 253 retrieves the two points 501 and 502 from the operation module 23. The information accepting module 253 calculates a distance 503 between the two points 501 and 502 to retrieve the number of pages corresponding to the distance between the two points. In the example illustrated in FIG. 5A, the distance 503 between the two points is approximately twice a distance 504 between page numbers. Accordingly, if the predetermined factor stated above is twice, for example, the number of pages is 4. The information accepting module 253 retrieves same number of page numbers as the retrieved number of pages as pointed page numbers. In the example illustrated in FIG. 5A, page numbers of 4 pages in the positive direction, starting at page number "13", i.e., page numbers "13" to "17", are retrieved as pointed page numbers. Note that of 4 pages in the negative direction starting at page number "13", i.e., page numbers "9" to "13", may be retrieved as pointed page numbers. The information accepting module 253 displays the pointed page numbers "13" to "17" in the display field for a pointed page number 330.

Note that the method for retrieving pointed page numbers is not limited to the method described above. For example, the information accepting module 253 may determine the same number of pointed page numbers as a particular number of pages from the positional relation between the position of an previous specified page number that has been specified beforehand by a flick operation in the scroll pager (the center position in the scroll pager) and the respective positions of two points newly pointed by an operation such as a tap operation or a swipe operation.

For example, the information accepting module 253 may determine the same number of pointed page numbers as a particular number of pages on the basis of the distances between the position of a previous specified page number and the respective positions of pointed two points. In that case, the information accepting module 253 subtracts the position of the previous specified page number (center) from the respective positions of pointed two points (touch 4, touch 5) to obtain the distances (distance 4, distance 5) between the position of the previous specified page number and the respective positions of the pointed two points. Specifically, the distance to a pointed position that is located on the left side of the previous specified page number indicates a negative value whereas the distance to a pointed position that is located on the right side of the previous specified page number indicates a positive value. The information accepting module 253 then divides the distance (distance 4) calculated for one (touch 4) of the pointed two points on the negative direction side by the distance (distance 3) between page numbers, multiplies the quotient by a predetermined factor (n, for example 2), and adds the product to the previous specified page number to obtain the first one of the pointed page numbers (first page number=previous specified page number (distance 4/distance 3)×n). The information accepting module 253 divides the distance calculated for the other (touch 5) of the pointed two points on the positive direction side by the distance between page numbers, multiplies the quotient by the predetermined factor, and adds the product to the previous specified page number to obtain the last one of the pointed page numbers (last page number=previous specified page number (distance 5/distance 3)×n). Here, n may be greater than or equal to 1 or may be less than 1.

Note that the information accepting module 253 may obtain page numbers that are closest to the positions of the pointed two points as the first page number and the last page number.

In these examples, page information included in a retrieving request for item information can be determined from the positional relations between the position of a page that has been specified beforehand in the scroll pager and newly specified two positions.

FIG. 5B is a schematic diagram for illustrating another example of a process for retrieving the number of pages and pointed page numbers according to pointed two points.

In the example illustrated in FIG. 5B, the information accepting module 253 determines the same number of indicated page numbers as a particular number of pages on the basis of positional relation between a center position 513 in the scroll pager 310 and the position of each of two points 511 and 512 pointed by a tap operation. In this example, a distance 514 between the center position 513 and one 511 of the two points on the negative direction side is divided by the distance 504 between page numbers, the quotient (−2) is multiplied by a predetermined factor (2), and the product (−4) is added to a previous specified page number "13" to obtain the first one of the pointed page numbers, "9". On the other hand, a distance 515 between the center position 513 and the other 512 of the two points on the positive direction side is divided by the distance 504 between page numbers, the quotient (1) is multiplied by the predetermined factor (2), and the product (2) is added to the previous specified page number "13" to obtain the last one of the pointed page numbers, "15". The information accepting module 253 displays the determined page numbers "9" to "15" in the display field for a pointed page number 330.

Furthermore, when a swipe operation that points two points in the scroll pager is performed by the user, the information accepting module 253 displays page numbers corresponding to two points that are pointed in response to the swipe operation in the display field for a pointed page number in real time in accordance with display data of pointed page numbers received from the server 3. This allows the user to know the page numbers currently being selected and to accurately specify a desired page number because the display of the page numbers corresponding to the two points that are currently pointed with fingers of the user changes in real time.

The information accepting module 253 then provides the pointed page number that has been pointed when the tap operation, swipe operation or the like pointing two points in the scroll pager is completed by the user, i.e., when the fingers of the user are taken off the touch panel, to the display control module 252 as a specified page number.

Figure 6A:
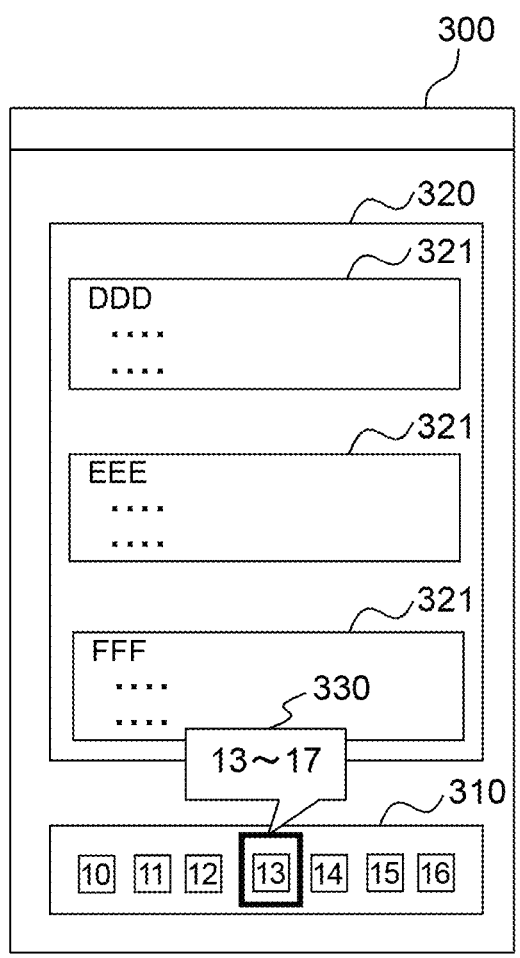
FIG. 6A is a schematic diagram for illustrating a specified page number.
Figure 6B:
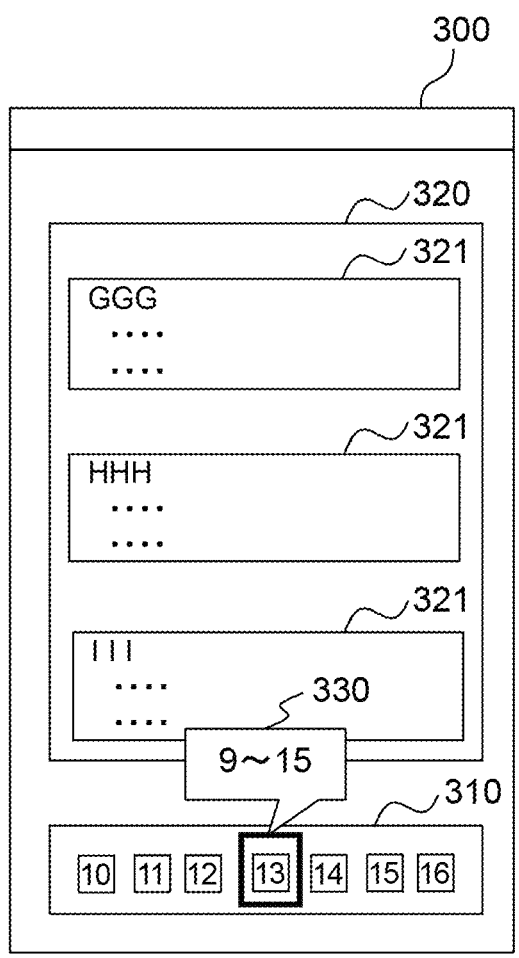
FIG. 6B is a schematic diagram for illustrating a specified page number.

FIGS. 6A and 6B are schematic diagrams for illustrating a specified page number.

FIG. 6A illustrates a state where fingers of the user are taken off the touch panel in the state illustrated in FIG. 5A. In FIG. 6A, page numbers "13" to "17" are provided as specified page numbers to the server 3 through the display control module 252 and pieces of item information 321 which correspond to the page numbers "13" to "17" are displayed in the item list 320. Note that while the pieces of item information 321 displayed in the item list 320 in FIG. 6A are the same as the pieces of item information 321 displayed in the item list 320 in FIG. 5A, more pieces of item information than the pieces of item information displayed in the item list 320 in FIG. 5A are displayed by vertically scrolling the item list 320 in FIG. 6A.

FIG. 6B illustrates a state where fingers of the user are taken off the touch panel in the state illustrated in FIG. 5B. In FIG. 6B, page numbers "9" to "15" are provided as specified page numbers to the server 3 through the display control module 252 and pieces of item information 321 which correspond to the page numbers "9" to "15" are displayed in the item list 320.

Note that the information accepting module 253 may provide two points that are pointed in response to a swipe operation as specified page numbers to the display control module 252 in real time rather than upon completion of the user's swipe operation pointing two points in the scroll pager.

Figure 7:
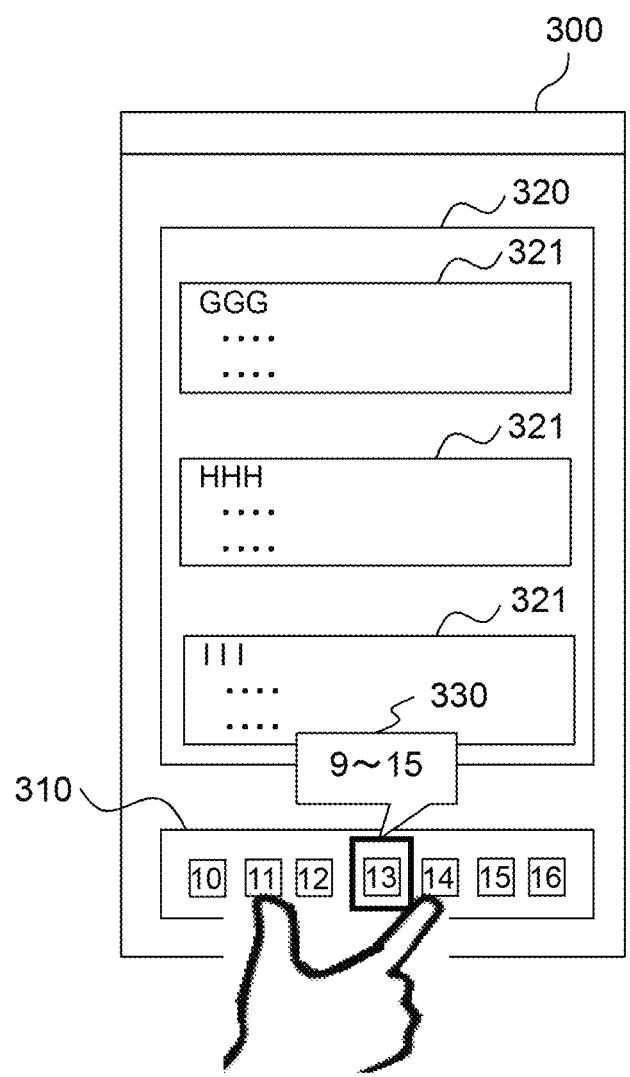
FIG. 7 is a schematic diagram for illustrating a process for providing two points pointed in response to a swipe operation as specified page numbers in real time.

FIG. 7 is a schematic diagram for illustrating a process for providing two points pointed in response to a swipe operation as specified page numbers in real time.

In FIG. 7, in response to a swipe operation by the user, i.e. when fingers of the user are not taken off the touch panel, page numbers "9" to "15" are provided as specified page numbers to the server 3 through the display control module 252 and pieces of item information 321 displayed in the item list 320 and the number of pieces of item information displayed in the item list 320 changes in real time.

(2.2) Configuration of Server 3

Figure 8:
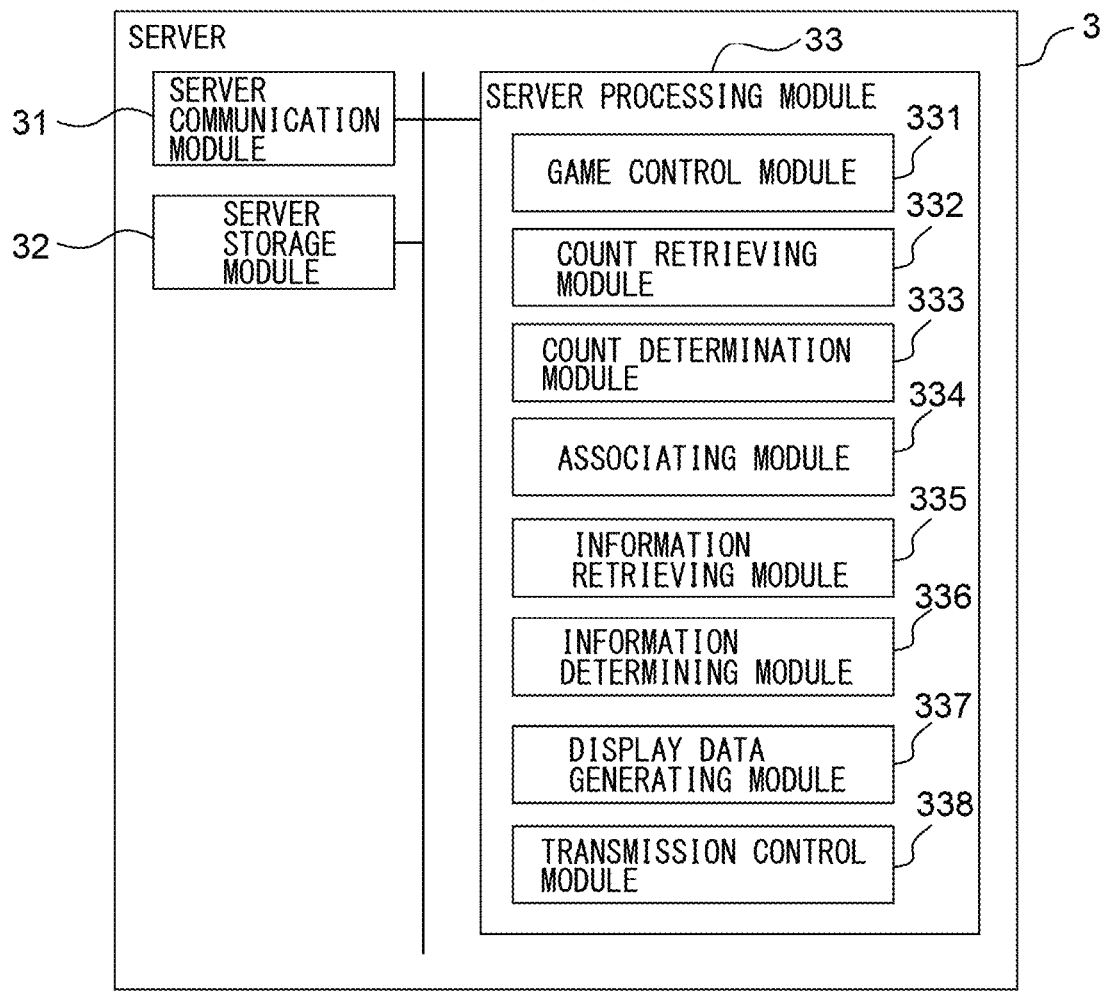
FIG. 8A is a diagram illustrating an example of a general configuration of a server 3.
FIG. 8B is a diagram illustrating an example of data structures of various management tables.
FIG. 8C is a diagram illustrating an example of data structures of various management tables.

FIG. 8A is a diagram illustrating an example of a general configuration of the server 3.

The server 3 provides a predetermined game to portable devices 2, stores a plurality of pieces of item information used in the game and, in response to a request from a portable device 2, sends item information corresponding to a page number requested to the portable device 2. For that purpose, the server 3 includes a server communication module 31, a server storage module 32, and a server processing module 33.

The server communication module 31 is an example of an output module, includes communication interface circuitry for connecting the server 3 to the Internet 8, and communicates with the Internet 8. The server communication module 31 provides the data received from portable devices 2 and the like to the server processing module 33. Furthermore, the server communication module 31 sends the data provided from the server processing module 33 to the portable devices 2 and the like.

The server storage module 32 includes at least one of a magnetic tape unit, a magnetic disk unit, and an optical disc unit, for example. The server storage module 32 stores an operating system program, driver programs, application programs, data and the like used for processing in the server processing module 33. For example, the server storage module 32 stores as an application program a game program or the like that, in response to a request from a portable device 2, sends requested item information to the portable device 2. The computer program may be installed on the server storage module 32 from a computer-readable, non-transitory medium such as a compact disk read only memory (CD-ROM), a digital versatile disk read only memory (DVD-ROM), or the like by using a well-known setup program or the like. The server storage module 32 also stores data such as a user management table (FIG. 8B) for managing users, an item management table (FIG. 8C) for managing item information, and the total number of pieces of item information stored in the item management table. In addition, the server storage module 32 may temporarily store temporary data relating to a given process.

FIGS. 8B and 8C are diagrams illustrating an example of data structures of various management tables.

FIG. 8B illustrates a user management table for managing users. The user management table stores an identification number of each user (hereinafter referred to as the user ID), the name and password of the user, associations between page numbers and pieces of item information for the portable device 2 of the user, the display item count, the number of a plurality of pages for which the item information is displayed, and the like.

FIG. 8C illustrates an item management table for managing item information. The item management table stores an identification number of each piece of item information (hereinafter referred to as information ID), the piece of item information itself and the like. Note that the piece of item information is sorted in the reverse chronological order, for example, starting at the top.

The server processing module 33 includes one or more processors and their peripheral circuitry. The server processing module 33 centrally controls the general operations of the server 3 and may be a CPU, for example. The server processing module 33 controls operations of the server communication module 31 and other modules so that various processes on the server 3 are executed using proper procedures in accordance with programs and the like stored in the server storage module 32. The server processing module 33 executes processes on the basis of the programs (the operating system program, the driver programs, the application programs and the like) stored in the server storage module 32. The server processing module 33 is also capable of executing a plurality of programs (such as application programs) in parallel.

(2.2.1) Configuration of Server Processing Module 33

The server processing module 33 includes a game control module 331, a count retrieving module 332, a count determining module 333, an associating module 334, an information retrieving module 335, an information determining module 336, a display data generating module 337, and a transmission control module 338. These modules are functional modules implemented by programs to be executed on a processor or processors provided in the server processing module 33. Alternatively, these modules may be incorporated in the server 3 as firmware.

The game control module 331 controls the progress of a game. When a user authentication request is received from a portable device 2 through the server communication module 31, the game control module 331 analyzes the received user authentication request to identify a user ID and a password. The game control module 331 then uses the identified user ID and password as parameters to instruct a user authentication module (not depicted) to execute processing.

When authentication by the user authentication module is successful, the game control module 331 sends a game screen for performing the game to the portable device 2 through the server communication module 31 and thereafter performs processing for the game.

The count retrieving module 332 retrieves a retrieving request for display data from each portable device 2 through the server communication module 31, stores a display item count included in the retrieving request for display data in the user management table in the server storage module 32, and provides the display item count to the count determining module 333.

Note that the display item count may be stored beforehand in the user management table in the server storage module 32 rather than retrieving from the portable device 2. This enables the server 3 to manage the number of pieces of item information per page to be displayed on each portable device 2.

The count determining module 333 reads out the total number of pieces of item information and the display item count from the server storage module 32 and determines the number of pages when a plurality of pieces of item information are divided into a plurality of pages for display (hereinafter referred to as the total page count), from the total number of pieces of item information and the display item count thus read out. The count determining module 333 divides the total number of pieces of item information by the display item count to calculate the total page count. The count determining module 333 stores the calculated total page count in the server storage module 32 and provides the total page count to the display data generating module 337.

The associating module 334 reads out the display item count from the server storage module 32 and determines item information contained in each page from the display item count thus read out. The associating module 334 associates each piece of item information contained in each page with the page number of each of same number of pages as the total page count and stores the associations in the user management table in the server storage module 32.

The associating module 334 associates pieces of item information in ascending order of information IDs with pages in ascending order of the page numbers. The number of pieces of information associated with each page is equal to the display item count. The associating module 334 associates each page number with the "display item count× (the page number−1)+1"-th piece of item information to the "display item count×the page number"-th piece of item information.

For example, if the display item count is 10, the page number "1" is associated with the first piece of item information to the tenth piece of item information and the page number "13" is associated with the 121st piece of item information to the 130th piece of item information.

When the information retrieving module 335 retrieves a retrieving request for item information including page information from each portable device 2 through the server communication module 31, the information retrieving module 335 provides the page information included in the retrieving request for item information to the information determining module 336.

When page information is provided from the information retrieving module 335 to the information determining module 336, the information determining module 336 determines, on the basis of the associations stored in the user management table in the server storage module 32, pieces of item information contained in the page corresponding to the provided page information as the pieces of item information to be displayed. The information determining module 336 then provides the information IDs of the determined pieces of item information to the display data generating module 337.

When a total page count is provided from the count determining module 333 to the display data generating module 337, the display data generating module 337 reads out a same number of pieces of item information as the display item count, starting at the top of the item management table in the server storage module 32, generates display data to be displayed on the portable device 2, provides the display data to the transmission control module 338, and outputs the display data from the server communication module 31. The display data generated includes initial item display data, display data of all page numbers in which the page number of the first page is the specified page number, and display data of specified page numbers.

When information IDs of item information are provided from the information determining module 336 to the display data generating module 337, the display data generating module 337 reads out pieces of item information corresponding to the provided information IDs from the item management table in the server storage module 32. The display data generating module 337 generates item display data for displaying the item information thus read out, provides the item display data to the transmission control module 338, and outputs the item display data from the server communication module 31. The item display data is generated using a technique such as Ajax (registered trademark).

When display data including initial item display data, display data of all page numbers and display data of specified page numbers is provided from the display data generating module 337 to the transmission control module 338, the transmission control module 338 sends the provided display data to each portable device 2 through the server communication module 31. When item display data is provided from the display data generating module 337 to the transmission control module 338, the transmission control module 338 sends the provided item display data to each portable device 2 through the server communication module 31.

(3) Operation of Game System 1

Figure 9:
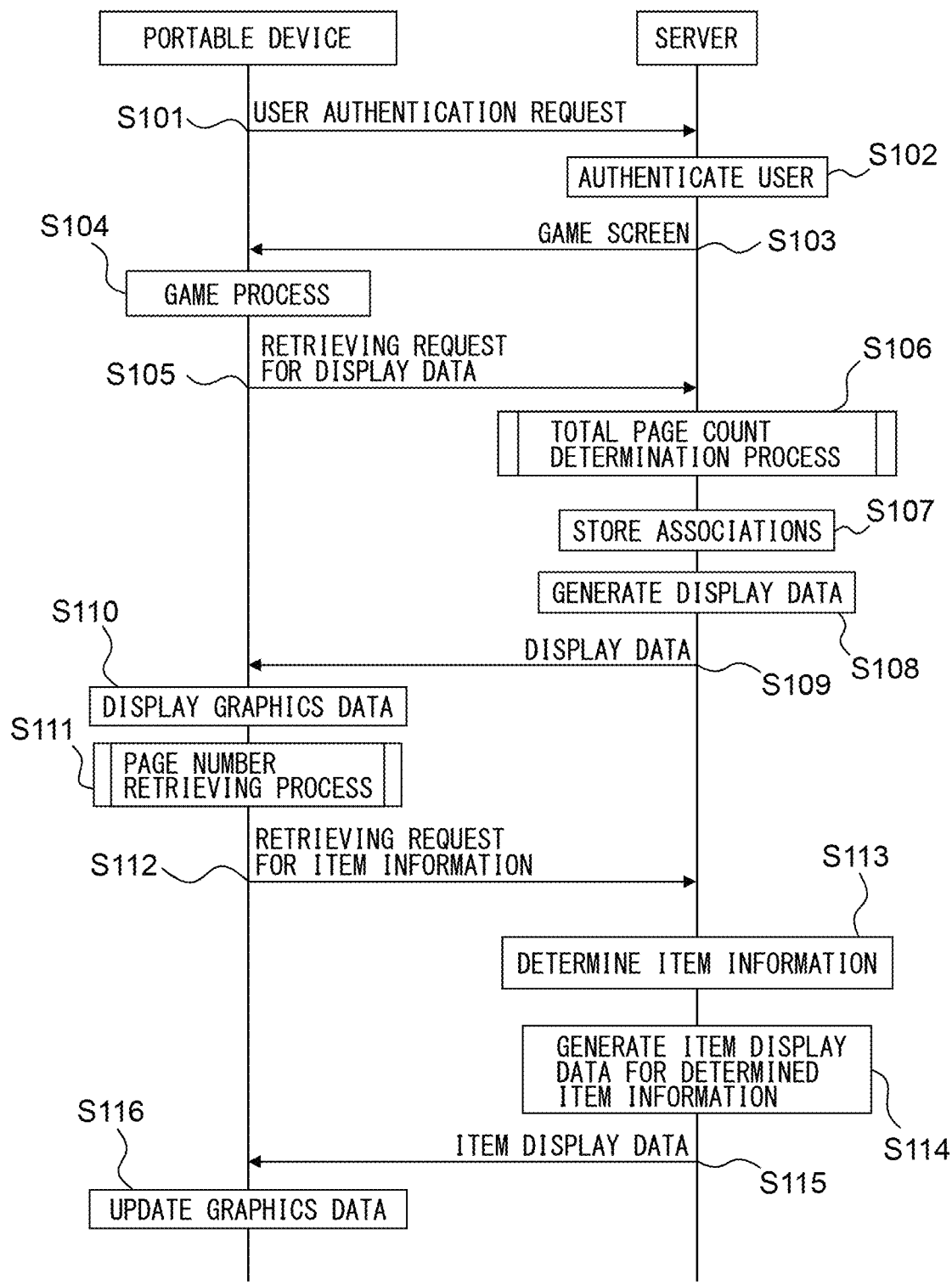
FIG. 9 is a diagram illustrating an example of an operation sequence for displaying item information.

FIG. 9 illustrates an example of an operation sequence for displaying item information in the game system 1. Note that the operation sequence described below is performed mainly by the device processing module 25 and the server processing module 33 in cooperation with the modules of a portable device 2 and the server 3 in accordance with programs stored in the device storage module 22 and the server storage module 32 beforehand.

First, a user uses the operation module 23 of the portable device 2 to instruct the device processing module 25 to execute a browser program. The device processing module 25 starts processing in accordance with the browser program. Specifically, when the game executing module 251 of the browsing executing module 250 implemented by the browser program accepts a game start instruction from the user by using the operation module 23, the game executing module 251 further uses the operation module 23 to accept a user ID and a password from the user. The game executing module 251 then sends a user authentication request including the user ID and the password to the server 3 through the device communication module 21 (step S101).

When the game control module 331 of the server 3 receives the user authentication request from the portable device 2 through the server communication module 31, the game control module 331 analyzes the received user authentication request to identify the user ID and the password. The game control module 331 then uses the identified user ID and the password as parameters to instruct a user authentication module (not depicted) to execute an authentication process (step S102).

When the authentication by the user authentication module is successful, the game control module 331 sends a game screen for performing the game to the portable device 2 through the server communication module 31 (step S103).

The game executing module 251 of the portable device 2 displays the game screen retrieved from the server 3 through the device communication module 21 on the display module 24 and thereafter performs processing for the game (step S104).

When the display control module 252 uses the operation module 23 to accept an instruction to display item information from the user, the display control module 252 reads out the display item count from the device storage module 22, and sends a retrieving request for display data including the display item count thus read out to the server 3 through the device communication module 21 (step S105).

When the count retrieving module 332 of the server 3 retrieves the retrieving request for display data from the portable device 2 through the server communication module 31, the count retrieving module 332 stores the display item count included in the retrieving request for display data in the server storage module 32 and provides the display item count to the count determining module 333. Then, the count determining module 333 performs a total page count determination process for calculating the total page count (step S106).

Figure 10:
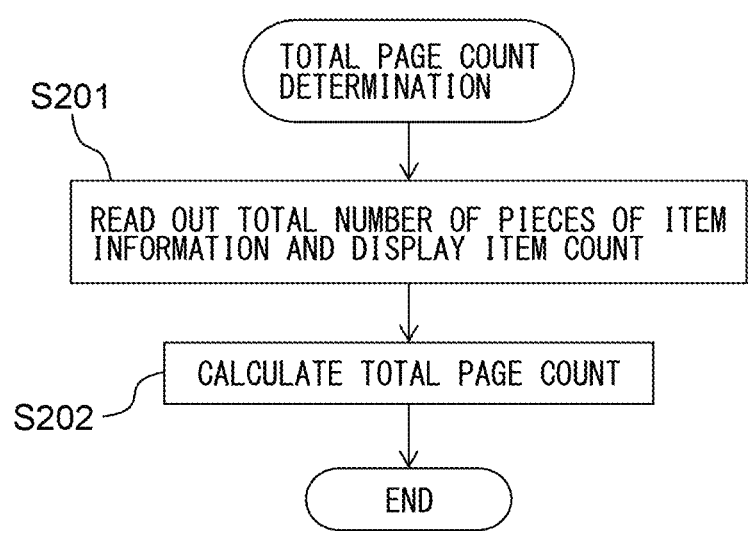
FIG. 10 is a diagram illustrating an example of an operation flow of a total page count determination process.

FIG. 10 is a diagram illustrating an example of operation flow of the total page count determination process performed by the count determining module 333.

First, the count determining module 333 reads out the total number of pieces of item information and the display item count from the server storage module 32 (step S201). The count determining module 333 then divides the total number of pieces of item information by the display item count to calculate the total page count (step S202), stores the calculated total page count in the server storage module 32, provides the total page count to the display data generating module 337, and ends the sequence of the steps.

Returning to FIG. 9, the associating module 334 reads out the display item count from the server storage module 32, determines item information contained in each page from the display item count thus read out, associates each piece of item information contained in each page with the page number of each of the same number of pages as the total page count, and stores the associations in the user management table in the server storage module 32 (step S107).

Then the display data generating module 337 reads out the same number of pieces of item information as the display item count of one page, starting at the top of the item management table in the server storage module 32, generates display data to be displayed on the portable device 2 (step S108), and provides the display data to the transmission control module 338. The display data includes initial item display data, display data of all page numbers in which the page number of the first page is the specified page number, and display data of specified page numbers.

Then the transmission control module 338 sends the display data generated by the display data generating module 337 to the portable device 2 through the server communication module 31 (step S109).

When the display control module 252 of the portable device 2 retrieves the display data from the server 3 through the device communication module 21, the display control module 252 analyzes the retrieved display data, stores the pieces of item information included in the display data in the device storage module 22, generates graphics data, and displays the generated graphics data on the display module 24 (step S110).

Then the information accepting module 253 uses the operation module 23 to perform a page number analysis process for accepting a page number specified by a scroll operation by the user (step S111).

Figure 11:
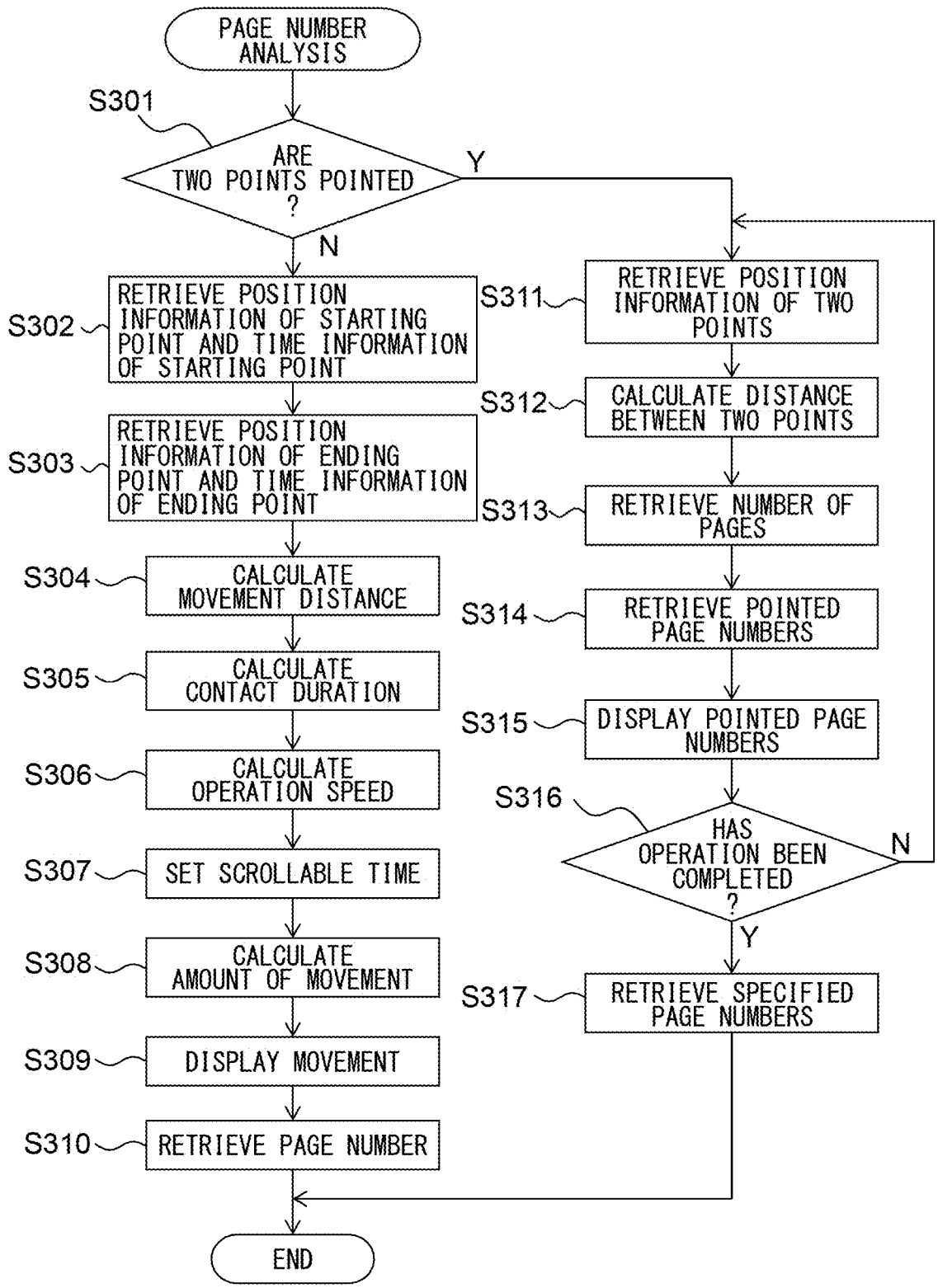
FIG. 11 is a diagram illustrating an example of an operation flow of a page number analysis process.

FIG. 11 is a diagram illustrating an example of operation flow of the page number analysis process performed by the information accepting module 253.

First, the information accepting module 253 determines whether or not two points in the scroll pager are pointed (step S301).

When two points in the scroll pager are not pointed (step S301—No), i.e. when one point is specified by a flick operation or other operation by the user, the information accepting module 253 retrieves position information of a starting point and time information of a starting point (step S302). The information accepting module 253 then retrieves position information of an ending point and time information of an ending point (step S303). The information accepting module 253 then calculates the movement distance from the position information of a starting point and the position information of an ending point (step S304), calculates contact duration from the time information of a starting point and the time information of an ending point (step S305), and calculates operation speed from the movement distance and the contact duration (step S306). The information accepting module 253 then sets a movable duration on the basis of the operation speed (step S307). The information accepting module 253 then calculates the amount of movement on the basis of the movement distance and the operation speed (step S308).

The information accepting module 253 then displays movement of the scroll pager on the display module 24 in such a way that the scroll pager moves by the calculated amount of movement (step S309). The information accepting module 253 then retrieves a page number located in a predetermined position at end of the movement of the scroll pager (step S310), provides the retrieved page number to the display control module 252, and ends the sequence of the steps.

On the other hand, when two points in the scroll pager are pointed by a tap operation, a swipe operation or other operation by the user (step S301—Yes), the information accepting module 253 retrieves first position information and second position information that indicate the positions of the pointed two points, respectively (step S311). The information accepting module 253 calculates the absolute value of the difference between the position indicated by the first position information and the position indicated by the second position information as the distance between the two points (step S312). The information accepting module 253 then retrieves the number of pages based on the distance between the two points on the basis of the distance between the two points and the distance between page numbers (step S313), and retrieves a same number of page numbers as the determined number of pages as pointed page numbers (step S314). The information accepting module 253 then displays the retrieved pointed page numbers in the display field for a pointed page number (step S315).

The information accepting module 253 then determines whether or not the user's tap operation, swipe operation or other pointing operation has been completed (step S316). When the user's tap operation, swipe operation or other pointing operation has not been completed (step S316—No), the information accepting module 253 returns the process to step S311 and repeats the processes of steps S311 to S316. On the other hand, when the user's tap operation, swipe operation or other pointing operation has been completed (step S316—Yes), the information accepting module 253 retrieves a pointed page number that has been pointed at the completion of the user's tap operation, swipe operation or other pointing operation as a specified page number (step S317), provides the retrieved specified page number to the display control module 252, and then ends the sequence of the steps.

Returning to FIG. 9, the display control module 252 sends a retrieving request for item information including the specified page number provided from the information accepting module 253 as the page information to the server 3 through the device communication module 21 (step S112).

When the information retrieving module 335 of the server 3 retrieves the retrieving request for item information from the portable device 2 through the server communication module 31, the information retrieving module 335 provides the page information included in the retrieving request for item information to the information determining module 336.

When the page information is provided from the information retrieving module 335, the information determining module 336 determines, on the basis of the associations stored in the user management table in the server storage module 32, pieces of item information to be displayed (step S113), and provides the information IDs of the determined pieces of item information to the display data generating module 337.

Then the display data generating module 337 reads out pieces of item information corresponding to the information IDs of the pieces of item information determined by the information determining module 336 from the item management table in the server storage module 32, generates item display data for the pieces of item information thus read out (step S114), and provides the item display data to the transmission control module 338.

The transmission control module 338 sends the item display data to the portable device 2 through the server communication module 31 (step S115).

When the display control module 252 of the portable device 2 retrieves the item display data from the server 3 through the device communication module 21, the display control module 252 stores update information contained in the retrieved item display data in the device storage module 22, updates graphics data on the basis of the retrieved item display data, and displays the updated graphics data on the display module 24 (step S116).

Note that the display control module 252 of the portable device 2 may store pieces of item information included in pieces of display data received from the server 3 at step S110 or S116 in the device storage module 22 in association with page numbers previously and then, if all of page numbers specified by the user are stored in the device storage module 22, the display control module 252 may display the stored item information. This eliminates the need for retrieving pieces of item information of a particular page from the server 3 again when the user has browsed the particular page, subsequently other pages and again the particular page. Consequently, the pieces of item information can quickly be displayed. Alternatively, the display control module 252 may retrieve only the pieces of item information of the page numbers specified by the user, which are not stored in the device storage module 22, from the server 3. This enables reduction of traffic on the network and quick display of the item information.

In addition, the display control module 252 of the portable device 2 may store pieces of item information included in pieces of display data received from the server 3 at step S110 or S116 in a memory on the browser (LocalStorage, which is a function of HTML 5) in association with page numbers previously and then, when all of the page numbers specified by the user are stored in the memory on the browser, the display control module 252 may display the stored pieces of item information. This enables reduction of traffic on the network and quick display of the item information.

Furthermore, after the display control module 252 of the portable device 2 retrieves from the server 3 pieces of item information corresponding to the specified page number(s) specified by the user and then displays the pieces of item information on the display module 24, the display control module 252 may retrieve pieces of item information corresponding to page numbers close to the specified page number(s) from the server 3. In this case, the display control module 252 sends a retrieving request for item information including a specified page number retrieved from the information accepting module 253 to the server 3 and then sends retrieving requests for item information each including a page number close to the specified page number to the server 3 in decreasing order of closeness to the specified page number. The information determining module 336 of the server 3 determines corresponding item information in accordance with the retrieving requests for item information received in sequence. Specifically, the information determining module 336 determines item information corresponding to a specified page number, then determines pieces of item information corresponding to page numbers close to the specified page number in descending order of closeness to the specified page number. The display data generating module 337 generates content data and control data for the determined pieces of item information in the order in which the information determining module 336 has determined the pieces of item information. In other words, the display data generating module 337 generates item display data for a specified page number and then generates pieces of item display data for pieces of item information corresponding to page numbers close to the specified page number in descending order of closeness to the specified page number. The transmission control module 338 sends the generated pieces of item display data to the portable device 2 through the server communication module 31 in the order in which the display data generating module 337 has generated the pieces of item display data.

For example, if page numbers "13" to "17" are specified, the server 3 sends pieces of item display data that correspond to the page numbers "13" to "17" to the portable device 2, then sends pieces of item display data that correspond to page numbers "12" and "18", and pieces of item display data that correspond to page numbers "11" and "19" to the portable device 2 in sequence.

When pieces of item information are stored in the server 3 in order according to some rule, for example, chronological order, a user is likely to want to browse item information close to the item information that the user is currently browsing. Accordingly, the portable device 2 retrieves item information close to the item information that the user is currently browsing from the server 3 beforehand, thereby eliminating the need for retrieving the close item information from the server 3 again when the user requests to browse the item information later on. Consequently, the item information can quickly be displayed. Note that the portable device 2 may retrieve item information close to the item information currently being browsed from the server 3 beforehand and may store the item information in the memory on the browser. This eliminates the need for retrieving the close item information from the server 3 again when the user requests to browse the item information later on. Consequently, the item information can more quickly be displayed.

As has been described above, the server 3 causes a portable device 2 to scrollably display page numbers of each page and causes the portable device 2 to display item information contained in the same number of pages as the number of pages based on the distance between two points that are specified by the user in a display region. Thus, the user can change the number of pages for which item information is displayed by a swipe operation, a tap operation or the like with two fingers. Accordingly, the user can easily and accurately change the number of pieces of item information displayed by a gesture that has a small movement range and can quickly be performed, and can browse desired item information in a short time with less labor even when there are many pieces of item information between item information currently being displayed and item information that the user wants to browse. Thus, UX when a user operates a device can be improved.

Furthermore, when the display of item information is requested, the server 3 first sends only the same number of pieces of item information as the display item count, starting at the first piece of item information, and subsequently sends only specified pieces of item information according to a request to change item information to be displayed. Accordingly, the server 3 can avoid sending the item information that the user does not want, thereby traffic on the network can be reduced. Furthermore, when the server 3 is requested to change item information to be displayed, the server 3 uses the technique of Ajax (registered trademark) to send only specified item information. Accordingly, the server 3 does not need to resend screen information other than the item information, such as a scroll pager, and therefore traffic on the network can be reduced.

This application is not limited to the embodiments described above. For example, while an example has been described in the embodiments in which a portable device 2 performs the page number analysis process, the server 3 may perform the page number analysis process. In that case, when one point is specified by a flick operation or other operation by the user, the information accepting module 253 of the portable device 2 sends position information of a starting point, time information of a starting point, position information of an ending point, and time information of an ending point to the server 3 through the device communication module 21. On the other hand, the information retrieving module 335 of the server 3 calculates movement distance from the retrieved position information of a starting point and position information of an ending point, calculates contact duration from the time information of a starting point and time information of an ending point, and calculates operation speed from the movement distance and the contact duration. Further, the information retrieving module 335 calculates movable duration on the basis of the operation speed, calculates the amount of movement on the basis of the movement distance and the operation speed, and retrieves a page number located at a predetermined position at the end of the movement of the scroll pager from the calculated amount of movement. Furthermore, the information retrieving module 335 sends the calculated movable duration and operation speed to the portable device 2 through the server communication module 31. The information accepting module 253 of the portable device 2 sets the movable duration retrieved from the server 3 through the device communication module 21 and displays movement of the scroll pager on the display module 24 in such a way that the scroll pager moves by the calculated amount of movement.

Furthermore, when two points are specified by a tap operation, a swipe operation or other operation by the user, the information accepting module 253 of the portable device 2 sends first position information and second position information to the server 3 through the device communication module 21. On the other hand, the information retrieving module 335 of the server 3 calculates the distance between the two points from the retrieved first position information and second position information, retrieves the number of pages corresponding to the two points, and retrieves the same number of specified page numbers as the number of pages. The information retrieving module 335 further sends the retrieved specified page numbers to the portable device 2 through the server communication module 31. The information accepting module 253 of the portable device 2 displays the specified page numbers retrieved from the server 3 through the device communication module 21 in the display field for a pointed page number.

While an example has been described in the embodiments in which the server 3 performs the total page count determination process, the portable device 2 may perform the total page count determination process. In that case, the device storage module 22 of the portable device 2 stores the total number of pieces of item information beforehand. Alternatively, the server 3 sends the total number of pieces of item information each time the total number of pieces of item information is changed and, the portable device 2 stores the received total number of pieces of item information in the device storage module 22. The device processing module 25 includes a count determining module that has the same function as the count determining modules 333 of the server 3, in addition to the modules illustrated in FIG. 2. The count determining module of the portable device 2 reads out the total number of pieces of item information and the display item count from the device storage module 22, calculates the total page count from the total number of pieces of item information and the display item count, and provides the total page count to the server 3 through the device communication module 21.

While an example has been described in the embodiments in which the server 3 performs the item information determination process, the portable device 2 may perform the item information determination process. In that case, the device processing module 25 of the portable device 2 includes an information determining module that has the same function as the information determining module 336 of the server 3, in addition to the modules illustrated in FIG. 2. The information determining module of the portable device 2 reads out the display item count from the device storage module 22 and retrieves a page number specified by the user from a page number analysis module. Then the information determining module determines pieces of item information that correspond to the page number from the display item count and the page number and provides the pieces of item information to the server 3 through the device communication module 21.

The server 3 may send all pieces of item information to the portable device 2 and the portable device 2 may divide a plurality of pieces of item information into a plurality of pages and display pieces of item information corresponding to a page specified by the user. In that case, the portable device 2 generates an item management table on the basis of the all pieces of item information received from the server 3, calculates the total number of the pieces of item information, and stores the total number of the pieces of item information in the device storage module 22. The device processing module 25 includes modules that have the same functions as the modules of the server processing module 33 of the server 3 other than the game control module 331, in addition to the modules illustrated in FIG. 2. The device processing module 25 sends and receives various kinds of information within the device processing module 25 instead of sending and receiving various kinds of information through the device communication module 21 and the server communication module 31, and the display module 24 functions as an output module.

Furthermore, the server 3 may be omitted and the portable device 2 may store all pieces of item information beforehand. In that case, the device storage module 22 stores an item management table, the total number of pieces of item information stored in the item management table and the like beforehand, and the device processing module 25 includes modules that have the same functions as the modules of the server processing module 33 of the server 3, in addition to the modules illustrated in FIG. 2. The device processing module 25 sends and receives various kinds of information within the device processing module 25 instead of sending and receiving various kinds of information through the device communication module 21 and the server communication module 31, and the display module 24 functions as an output module.

While the number of pieces of item information displayed per page is fixed in the present embodiment, the number of characters, the number of lines, the data size of item information per page or the like may be fixed. In that case, the device storage module 22 of each portable device 2 stores the number of characters, the number of lines, or the data size of item information that can be displayed per page, instead of the display item count, and the display control module 252 sends a retrieving request for display data including the number of characters, the number of lines, or the data size. On the other hand, the server storage module 32 of the server 3 stores the number of characters, the number of lines or the data size of each piece of item information and the count determining module 333 determines the total page count from the number of characters, the number of lines or the data size of each piece of item information and the number of characters, the number of lines, or the data size of item information per page. The associating module 334 determines item information contained in each page from the number of characters, the number of lines, or the data size of each piece of item information and the number of characters, the number of lines, or the data size of item information per page and associates each of same number of page numbers as the total page count with each piece of item information contained in each page.

While the present embodiment has been described by taking a game system as an example, this application is also applicable to a search system in which a server performs a search in response to a request from a device and displays search results on the device, and a message management system in which messages from a plurality of devices which are stored in a server are displayed on each device. If this application is applied to a search system, each search result is item information; if this application is applied to a message management system, each message is item information.

While the present embodiment has been described by taking a portable device as an example, a wired device such as a laptop PC that includes communication interface circuitry for connecting to the Internet 8 and directly communicates with the Internet 8 may be used instead of the portable device. In that case, a keyboard, a mouse and the like may be used as the operation module 23 and page numbers may be specified by a scroll operation by a user with the mouse.

A computer program for causing a computer to implement each function of the device processing module 25 and the server processing module 33 may be provided in the form of a program recorded on a computer-readable recording medium such as a magnetic recording medium or an optical recording medium.

It should be understood by those skilled in the art that various changes, substitutions, and modifications may be added to this application without departing from the spirit and scope of this application.

The preceding description has been presented only to illustrate and describe exemplary embodiments of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A page display method performed by an electronic device including a display with a touch panel, the page display method comprising:
   generating display data of a plurality of page indicators for a plurality of pages, each page containing predetermined item information;
   displaying the page indicators in a first display region of the display; and
   in response to receiving position information about two points among the page indicators specified by a user input of a user in the first display region to select a range of page indicators, the two points corresponding to two points of a continuous touch input operation performed on the touch panel of the display of the electronic device, the continuous touch input operation being an operation in which a plurality of fingers of the user are maintained on the touch panel,
   calculating a distance between the two points of the continuous touch input operation performed on the touch panel of the display of the electronic device, and calculating the distance between the two points of the continuous touch input operation and a distance between two consecutive page indicators to determine a number of the page indicators for the range of page indicators that is within the two points of the continuous touch operation, such that, the number of the page indicators is determined according to how many times the distance between the two points of the continuous touch input operation is compared to the distance between the two consecutive page indicators,
   based on the distance, generating a plurality of data sets for displaying the predetermined item information contained in a plurality of pages corresponding to the range of page indicators, each data set being selectable separately, and
   displaying the plurality of data sets in a second display region of the display, the second display region being different from the first display region, and the plurality of data sets being scrollable in the second display region and being displayed in real time while the continuous touch input operation, which is the operation in which the plurality of fingers of the user are maintained on the touch panel, is being performed on the touch panel of the display of the electronic device.

2. The page display method of claim 1, further comprising:
   determining the distance between the two consecutive page indicators displayed in the first display region.

3. The page display method of claim 1, further comprising:
   generating the plurality of data sets for displaying the predetermined item information contained in the plurality of pages based on the number of page indicators for the range of page indicators.

4. The page display method of claim 1, wherein each of the page indicators corresponds to a page number for each of the plurality of pages.

5. The page display method of claim 1, wherein the page indicators are displayed in a scrollable configuration in the first display region of the display.

6. The page display method according to claim 1, wherein the range of page indicators is wider than a range of the page indicators corresponding to the two points specified by the user input in the first display region.

7. The page display method according to claim 1, wherein the continuous touch input operation performed on the touch panel of the display of the electronic device corresponds to a swipe operation.

8. The page display method of claim 1, further comprising:
   multiplying a result of the calculating of the distance between the two points of the continuous touch input operation and the distance between the two consecutive page indicators, by a predetermined factor to determine the number of the page indicators.

9. An electronic device comprising:
circuitry configured to
   generate display data of a plurality of page indicators for a plurality of pages, each page containing predetermined item information;
   control a display with a touch panel to display the page indicators in a first display region of the display; and
   in response to receiving position information about two points among the page indicators specified by a user input of a user in the first display region to select a range of page indicators, the two points corresponding to two points of a continuous touch input operation performed on the touch panel of the display, the continuous touch input operation being an operation in which a plurality of fingers of the user are maintained on the touch panel,
   calculate a distance between the two points of the continuous touch input operation performed on the touch panel of the display, and calculate the distance between the two points of the continuous touch input operation and a distance between two consecutive page indicators to determine a number of the page indicators for the range of page indicators that is within the two points of the continuous touch operation, such that, the number of the page indicators is determined according to how many times the distance between the two points of the continuous touch input operation is compared to the distance between the two consecutive page indicators,
   based on the distance, generate a plurality of data sets for displaying the predetermined item information contained in a plurality of pages corresponding to the range of page indicators, each data set being selectable separately, and
   control the display to display the plurality of data sets in a second display region of the display, the second display region being different from the first display region, and the plurality of data sets being scrollable in the second display region and being displayed in real time while the continuous touch input operation, which is the operation in which the plurality of fingers of the user are maintained on the touch panel, is being performed on the touch panel of the display.

10. The electronic device of claim 9, wherein the circuitry is configured to determine the distance between the two consecutive page indicators displayed in the first display region.

11. The electronic device of claim 9, wherein the circuitry is configured to generate the plurality of data sets for displaying the predetermined item information contained in the plurality of pages based on the number of page indicators for the range of page indicators.

12. The electronic device of claim 9, wherein the circuitry is further configured to:
receive a user input selecting a first page indicator from the plurality of page indicators displayed in the first display region; and
generate the plurality of data sets so that the plurality of data sets includes the predetermined item information contained in a page corresponding to the selected first page indicator.

13. The electronic device of claim 9, wherein the predetermined item information is information corresponding to a stage in a quest or information corresponding to an enemy in a battle in a computer-based game.

14. The electronic device of claim 9, wherein the circuitry is configured to scroll the page indicators in response to a user input.

15. A non-transitory computer-readable medium including computer-program instructions, which when executed by an electronic device, cause the electronic device to:
generate display data of a plurality of page indicators for a plurality of pages, each page containing predetermined item information;
control a display with a touch panel to display the page indicators in a first display region of the display; and
in response to receiving position information about two points among the page indicators specified by a user input of a user in the first display region to select a range of page indicators, the two points corresponding to two points of a continuous touch input operation performed on the touch panel of the display, the continuous touch input operation being an operation in which a plurality of fingers of the user are maintained on the touch panel, calculate a distance between the two points of the continuous touch input operation performed on the touch panel of the display of the electronic device, and calculate the distance between the two points of the continuous touch input operation and a distance between two consecutive page indicators to determine a number of the page indicators for the range of page indicators that is within the two points of the continuous touch operation, such that, the number of the page indicators is determined according to how many times the distance between the two points of the continuous touch input operation is compared to the distance between the two consecutive page indicators, based on the distance, generate a plurality of data sets for displaying the predetermined item information contained in a plurality of pages corresponding to the range of page indicators, each data set being selectable separately, and control the display to display the plurality of data sets in a second display region of the display, the second display region being different from the first display region, and the plurality of data sets being scrollable in the second display region and being displayed in real time while the continuous touch input operation, which is the operation in which the plurality of fingers of the user are maintained on the touch panel, is being performed on the touch panel of the display.

* * * * *